US012333092B2

(12) United States Patent
Ivanov

(10) Patent No.: US 12,333,092 B2
(45) Date of Patent: Jun. 17, 2025

(54) STYLUS AND COLOR INFORMATION TRANSMITTING METHOD

(71) Applicant: Wacom Co., Ltd., Saitama (JP)

(72) Inventor: Vanio Kirilov Ivanov, Sofia (BG)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/612,215

(22) Filed: Mar. 21, 2024

(65) Prior Publication Data
US 2024/0231512 A1 Jul. 11, 2024

Related U.S. Application Data

(63) Continuation of application No. 17/199,201, filed on Mar. 11, 2021, now abandoned, which is a
(Continued)

(51) Int. Cl.
G06F 3/033 (2013.01)
G01J 3/02 (2006.01)
(Continued)

(52) U.S. Cl.
CPC ........ *G06F 3/03545* (2013.01); *G01J 3/0208* (2013.01); *G01J 3/0237* (2013.01);
(Continued)

(58) Field of Classification Search
CPC . G06F 3/03545; G06F 3/0442; G06F 3/04162
(Continued)

(56) References Cited

U.S. PATENT DOCUMENTS

2002/0122064 A1 9/2002 Yamakado
2003/0063943 A1* 4/2003 Lapstun ............... B43K 29/003
178/79
(Continued)

FOREIGN PATENT DOCUMENTS

EP 2 899 612 A1 7/2015
JP 2003-150304 A 5/2003
(Continued)

OTHER PUBLICATIONS

Extended European Search Report, dated Mar. 4, 2019, for European Application No. 15902197.1-1220 / 3340019, 20 pages.
(Continued)

Primary Examiner — Jonathan M Blancha
(74) Attorney, Agent, or Firm — Seed IP Law Group LLP

(57) ABSTRACT

Color information obtained by an optical sensor of a stylus can be displayed at a pen tip of the stylus with good visibility, and visual feedback is provided as a suitable user interface when the color information is transmitted from the stylus to an electronic apparatus. A stylus includes: a trigger signal generating circuit; an optical sensor that detects incident light; a memory circuit that stores color information of the incident light detected by the optical sensor; a color presenting circuit which is disposed at a pen tip of the stylus and which presents a color corresponding to the color information; and a control circuit. The control circuit presents the color information detected by the optical sensor using the color presenting circuit at the pen tip, and controls the color presenting circuit in response to a trigger signal from the trigger signal generating circuit when transmitting the color information to the electronic apparatus.

20 Claims, 21 Drawing Sheets

Related U.S. Application Data continuation of application No. 15/901,292, filed on Feb. 21, 2018, now Pat. No. 10,976,838, which is a continuation of application No. PCT/JP2015/073510, filed on Aug. 21, 2015.

(51) Int. Cl.
*G01J 3/50* (2006.01)
*G06F 3/0354* (2013.01)
*G06F 3/041* (2006.01)
*G06F 3/044* (2006.01)
*G06F 3/046* (2006.01)
*H04B 5/22* (2024.01)

(52) U.S. Cl.
CPC ........... *G01J 3/0256* (2013.01); *G01J 3/0264* (2013.01); *G01J 3/027* (2013.01); *G01J 3/0272* (2013.01); *G01J 3/501* (2013.01); *G06F 3/04162* (2019.05); *G06F 3/0442* (2019.05); *G06F 3/0446* (2019.05); *G06F 3/046* (2013.01); *H04B 5/22* (2024.01)

(58) Field of Classification Search
USPC ......................................................... 345/179
See application file for complete search history.

(56) References Cited

U.S. PATENT DOCUMENTS

| | | | |
|---|---|---|---|
| 2003/0128195 A1 | 7/2003 | Banerjee et al. | |
| 2007/0014490 A1* | 1/2007 | Silverbrook | G06F 3/03545 382/313 |
| 2008/0100593 A1* | 5/2008 | Skillman | G06F 3/042 345/175 |
| 2008/0181501 A1 | 7/2008 | Faraboschi et al. | |
| 2010/0141692 A1 | 6/2010 | Winarski | |
| 2011/0075146 A1 | 3/2011 | Moroney et al. | |
| 2011/0242361 A1 | 10/2011 | Kuwahara et al. | |
| 2014/0104224 A1 | 4/2014 | Ih et al. | |
| 2014/0145066 A1 | 5/2014 | Geaghan et al. | |
| 2014/0191711 A1 | 7/2014 | Leydon | |
| 2014/0223329 A1 | 8/2014 | Falaki et al. | |
| 2014/0253468 A1 | 9/2014 | Havilio et al. | |
| 2014/0253469 A1 | 9/2014 | Hicks et al. | |
| 2015/0029136 A1* | 1/2015 | Shahparnia | G06F 3/03545 345/174 |
| 2015/0194129 A1 | 7/2015 | Yan et al. | |
| 2015/0268755 A1* | 9/2015 | Craft | G01C 21/20 359/893 |
| 2015/0286293 A1* | 10/2015 | Gruhlke | G06F 3/03542 345/182 |
| 2015/0363012 A1 | 12/2015 | Sundara-Rajan et al. | |
| 2016/0005335 A1 | 1/2016 | Alsadah | |
| 2016/0048221 A1* | 2/2016 | Boulanger | G06F 3/0484 345/173 |
| 2016/0188012 A1 | 6/2016 | Sha | |
| 2016/0317089 A1 | 11/2016 | Fyfe et al. | |
| 2017/0322665 A1 | 11/2017 | Shim et al. | |

FOREIGN PATENT DOCUMENTS

| | | |
|---|---|---|
| JP | 3832404 B2 | 10/2006 |
| JP | 2011-018090 A | 1/2011 |
| TW | 201433946 A | 9/2014 |

OTHER PUBLICATIONS

International Search Report, mailed Nov. 24, 2015, for International Application No. PCT/JP2015/073510, 1 page.

* cited by examiner

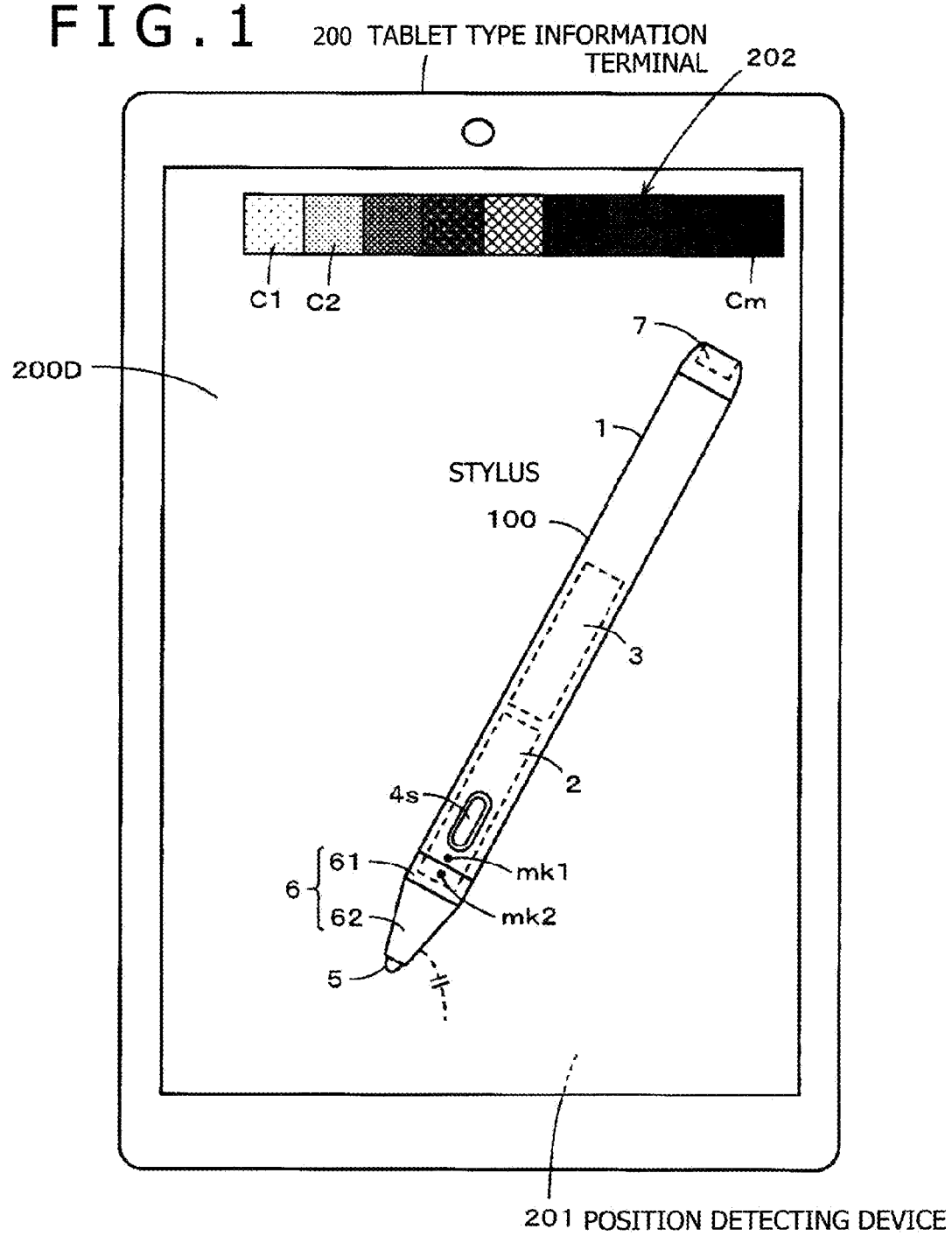

STYLUS AND COLOR INFORMATION TRANSMITTING METHOD

BACKGROUND

Technical Field

The present disclosure relates to a stylus for use in conjunction with an electronic apparatus having a display that makes display corresponding to an indicated position detected by a position detecting sensor.

Description of the Related Art

A position detecting sensor superimposed on a display of a tablet is used with a stylus (electronic pen) as a position indicator for allowing a user to perform position indicating operation on the position detecting sensor (on the display), and is increasingly used as input means for a personal computer or a tablet type terminal (hereinafter referred to simply as a tablet).

In this case, various colors can be selected for a locus, or a drawing line, formed by the movement of a position indicated by the stylus on the position detecting sensor (on the display). Various conventional measures for notifying the user of a method of selecting the color of the drawing line and the color in which the locus of the stylus is currently displayed have been proposed.

Patent Document 1 (Japanese Patent Laid-Open No. 2011-18090), for example, discloses that when a user sets an electronic pen P in a color detection mode by operating a switch 7 for mode selection of the electronic pen P, a color at a position touched by the pen point of the electronic pen P can be measured, and the measured color can be displayed on a display section 1 provided to the electronic pen P. In Patent Document 1, when the user ends the color detection mode by operating the switch 7 for mode selection of the electronic pen P, and the electronic pen P detects a depression of the pen point in a case where a terminal device T (tablet) is in a pen input mode, the color information detected in the color detection mode is transmitted to the terminal device T using a predetermined radio communication system. The terminal device T sets the received color information as a display color at a time of drawing by the electronic pen P.

In addition, in Patent Document 1, when the inside of a rectangular density region within a color palette Tcp is depressed by the electronic pen P by a knock operation, an outer frame of the rectangle on the color palette Tcp is made thicker and a region indicating the color density of the pen is changed to the same color density as in the selected region, and the electronic pen P controls a display circuit 2 to rewrite the display section 1 according to the density contents of a corresponding pen attribute and display the density contents of the corresponding pen attribute.

Further, in Patent Document 1, the user can make a photograph, a figure, or the like displayed in a part where the color palette Tcp is not displayed on a display section 10 of the terminal device T, specify a position on the photograph, the figure, or the like by the electronic pen P, and measure the color of the position. Alternatively, the user can directly measure the color of a surface of an actual thing such as paper or the like other than the terminal device T, and transmit the color as an attribute of the electronic pen P to the terminal device T.

Patent Document 2 (Japanese Patent Laid-Open No. 2003-150304) discloses that a pen type input device (stylus) obtains color information on a display screen of an information terminal device, and lights an LED according to the obtained color information and line width information.

Specifically, in Patent Document 2, when a pen point portion 107 of a pen type input device 1 is brought into contact with a first image 200b drawn on a first display section 200a as a display section of a first PDA 200, an end portion 107a receives the force of the contact, thus depressing a depression switch 107b. This generates a trigger signal, so that the pen type input device 1 obtains color information and line width information of drawing information of an image under the contact portion by radio communication from the PDA 200. At this time, the first PDA 200 side performs processing of reading the coordinates of the contact position in response to a trigger signal generated by an operation of application software for drawing, which is compatible with the pen type input device 1, extracting the color information and the line width information from the drawing information corresponding to the coordinates, and transmitting the color information and the line width information to the pen type input device 1 by radio communication. When the pen type input device 1 then obtains the color information and the line width information, the pen type input device 1 stores the color information and the line width information as setting contents at a time of drawing in a memory IC 114, and lights an LED located inside a pen tip portion 111 according to the obtained color information and the obtained line width information.

PRIOR ART DOCUMENTS

Patent Documents

Patent Document 1: Japanese Patent Laid-Open No. 2011-18090

Patent Document 2: Japanese Patent Laid-Open No. 2003-150304

BRIEF SUMMARY

Technical Problems

In the above-described Patent Document 1, the color of the position touched by the electronic pen is detected by a light receiving sensor, and the color is displayed by the display section 1. However, the display section 1 is provided in the vicinity of a clip portion 9 rather than on the pen point side of the electronic pen P. Thus, when the color is to be checked on the display section 1, a line of sight needs to be temporarily shifted from a pen point watched when the electronic pen P is operated, to the display section 1 provided in the vicinity of the clip portion 9. Operability at the time of drawing is thus impaired. In addition, the display section 1 merely has a function of simply displaying the color of the position touched by the pen point of the electronic pen P. Further, there is no visual feedback to the display section 1 when the color measured by the electronic pen P is transmitted to the terminal device T.

In the above-described Patent Document 2, the LED is provided to the pen point of the pen type input device. However, the pen type input device merely has a function of lighting the LED according to the color information and the line width information obtained from the PDA.

The present disclosure addresses the above problems, and it is an aspect of the present disclosure to present color information obtained by an optical sensor without a line of sight at a time of a stylus operation being moved from a pen point. Further, a plurality of visual feedbacks may be provided, when transmitting the color information obtained by the optical sensor to an electronic apparatus, by making presentation in such a manner as to be distinguishable from the presentation of the color information obtained by the optical sensor, that is, in a presentation pattern different from a color information presentation pattern at a time of obtaining the color information by the optical sensor. Thus, presentation visibility and presentation distinguishability can be enhanced at the time of the stylus operation. It is another aspect of the present disclosure to improve a user interface by determining whether or not an application installed on the electronic apparatus and supporting stylus operation is operating, or whether or not a radio link between a stylus and the electronic apparatus is established, and providing feedback corresponding to a result of the determination by the stylus.

Technical Solution

In order to solve the above problems, according to the present disclosure, there is provided a stylus for use in conjunction with an electronic apparatus, the electronic apparatus including a position detecting sensor detecting a position indicated by the stylus and a display making display corresponding to the position indicated by the stylus, the position being detected by the position detecting sensor, the stylus including:
 a trigger signal generating circuit;
 an optical sensor detecting incident light;
 a memory circuit storing color information of the incident light detected by the optical sensor;
 a color presenting circuit;
 a radio transmitting circuit transmitting the color information stored in the memory circuit to the electronic apparatus;
 a radio receiving circuit receiving a signal from the electronic apparatus; and
 a control circuit;
 wherein the color presenting circuit is disposed in a pen tip portion of the stylus;
 the control circuit detects the color information by the optical sensor and controls the color presenting circuit disposed in the pen tip portion of the stylus so as to present the color information in response to a trigger signal of the trigger signal generating circuit;
 when transmitting the color information detected by the optical sensor to the electronic apparatus by the radio transmitting circuit, the control circuit controls the color presenting circuit disposed in the pen tip portion of the stylus so as to make presentation distinguishable from color presentation at a time of detecting the color information by the optical sensor.

In the stylus having the above-described constitution, the color presenting circuit is disposed in the pen tip portion of the stylus. Thus, a type of color presentation by the color presenting circuit can be checked without a line of sight being moved at a time of drawing operation. In addition, when the color information is transmitted to the electronic apparatus, the color presenting circuit disposed in the pen tip portion makes presentation distinguishable from color presentation at a time of the detection of the color information by the optical sensor. It is thus possible to visually recognize and identify a state of operation of the stylus in a state of watching the pen point.

Advantageous Effects

According to the present disclosure, the color presenting circuit is disposed in the pen tip portion of the stylus. Thus, color presentation by the color presenting circuit can be visually recognized without a line of sight being moved away from the pen point of the stylus. It is thereby possible to improve operability of the stylus at a time of drawing. Furthermore, a user-friendly user interface is provided because color presentation control is performed which provides a plurality of visual feedbacks corresponding to states of operation of the stylus.

BRIEF DESCRIPTION OF THE SEVERAL VIEWS OF THE DRAWINGS

FIG. 1 is a diagram depicting a first embodiment of a stylus according to the present disclosure together with an electronic apparatus including a position detecting sensor.

DETAILED DESCRIPTION

Figure 2A:
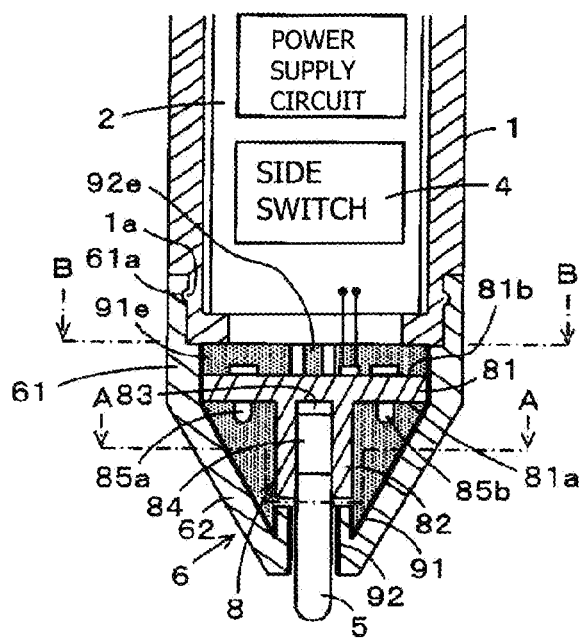
FIGS. 2A-2C illustrate a constitution of an example of principal parts of the first embodiment of the stylus according to the present disclosure.

A few embodiments of a stylus according to the present disclosure will hereinafter be described with reference to the drawings.

First Embodiment

FIG. 1 depicts an example of a tablet type information terminal 200 as an example of an electronic apparatus using a stylus 100 according to an embodiment of the present disclosure. In the present example, the tablet type information terminal 200 has a display screen 200D of a display (display device) such as an LCD (Liquid Crystal Display) or the like, and has a capacitance type position detecting device 201 on the display screen 200D (on a top surface side).

A user indicates a position on a position detecting sensor of the position detecting device 201 of the tablet type information terminal 200 with an indicator such as the stylus 100, a finger, or the like. The position detecting device 201 detects the position indicated by the stylus 100 or the finger on the position detecting sensor of the position detecting device 201 by a capacitive coupling method. In the present embodiment, the stylus 100 constitutes an active capacitive type position indicator that transmits a predetermined signal, or an oscillating signal having a predetermined frequency in the present example, to the position detecting sensor of the capacitively coupled position detecting device 201.

The position detecting device 201 in the present example can detect the position indicated by the stylus 100 by receiving the oscillating signal from the stylus 100 as the active capacitive type position indicator. The position detecting device 201 in the present example also has a function of detecting a position indicated by a finger by a passive capacitive method. The position detecting device 201 in the present example can detect the position indicated by the stylus 100 and the position indicated by the finger simultaneously, by performing position detection by the active capacitive method for detecting the position indicated by the stylus 100 and performing position detection by the passive capacitive method for detecting the position indicated by the finger in a time-division manner.

The tablet type information terminal 200 performs processing according to the position indicated by the indicator such as the stylus 100, the finger, or the like, wherein the position is detected by the position detecting device 201. In the present embodiment, when the processing according to the instruction input of the indicator such as the stylus 100, the finger, or the like is display of an indicated locus, the tablet type information terminal 200 displays the indicated locus on the display screen 200D in a display color based on color information stored in a memory of the tablet type information terminal 200.

The memory of the tablet type information terminal 200 stores the color information, as will be described later. In the present embodiment, as will be described later, there are two possible methods as methods of setting the color information stored in the memory. The two possible methods include a method in which the user selects and sets the color information from a color palette 202 displayed on the display screen 200D of the tablet type information terminal 200 with a finger or the stylus 100, and a method in which the color information "picked up" by the user with the stylus 100 is transmitted to the tablet type information terminal 200 and set in the tablet type information terminal 200.

The color palette 202 is displayed in a predetermined region of the display screen 200D, or an upper portion of the display screen 200D in the example of FIG. 1. On the color palette 202, a plurality of colors usable when the stylus 100 draws a locus on the position detecting sensor are displayed as predetermined respective color regions C1, C2, . . . , Cm (m is as an integer of 2 or more) different from each other as depicted in the figure. When one of the color regions C1, C2, . . . , Cm of the color palette 202 on the display screen 200D is selected by a finger or the stylus 100, the tablet type information terminal 200 recognizes color information corresponding to the color region selected by the finger or the stylus 100 by the position detecting device 201, stores the color information in the memory, and sets the color information as the color of a locus to be drawn by the stylus 100 on the tablet type information terminal 200.

The stylus 100 according to the present embodiment has a housing (casing) 1 having a pen-shaped external appearance. The housing 1 is formed by an insulator made of an insulating material, for example a synthetic resin, and having a hollow cylindrical shape. In the present embodiment, at least a part of the outer circumferential surface of the housing 1 at which part the operator holds the stylus 100 is covered with a conductor made of a metal, for example.

As depicted in FIG. 1, a printed board 2 and a battery 3 are arranged within the housing 1. The printed board 2 is provided with a side switch to be turned on and off by an operating section 4S. Though not depicted in the figure, the conductor covering the outer circumferential surface of the housing 1 is electrically connected to the grounding conductor of the printed board 2.

The battery 3 supplies power to electronic circuits and electronic parts within the stylus 100. The battery 3 is for example formed by a rechargeable battery, a capacitor, or the like. The battery 3 may of course be a dry cell battery.

As depicted in FIG. 1, a sleeve 6 having a through hole into which a core body 5 is inserted is fitted to the pen point side of the housing 1. In addition, a USB connector 7 is provided to an end portion of the housing 1, which is on an opposite side from the pen point side. The USB connector 7 is connected to a charging circuit (not depicted) of the battery 3. The stylus 100 is connected to an electronic apparatus through the USB connector 7, and charges the battery 3 by the charging circuit.

The stylus 100 in the present embodiment has a color information pickup functional section that picks up a color at an arbitrary position, and has a functional section that retains the picked-up color information in a memory and that transmits the picked-up color information to the tablet type information terminal 200. The stylus 100 has an optical sensor that detects incident light, as will be described later, to pick up a color at an arbitrary position. The stylus 100 picks up a color at an arbitrary position by receiving incident light from the arbitrary position with the optical sensor, and extracting color information from information on the light received by the optical sensor. The stylus 100 stores the color information in the memory.

The stylus 100 also has a color presenting circuit that presents the color information stored in the memory to the user. As will be described later, the color presenting circuit in the present example includes color light emitting units using LEDs (Light Emitting Diodes), for example. The color light emitting units are controlled so as to emit color light corresponding to the color information retained in the memory.

The stylus 100 also has a pressure detecting circuit (pen pressure detecting circuit) that detects a pressure (pen pressure) applied to a pen point, and has a function of transmitting the detected pressure to the tablet type information terminal 200. The pressure detecting circuit in the present embodiment uses a method of optically detecting the pressure (pen pressure) using the optical sensor described above. A detailed configuration of the pressure detecting circuit will be described later. The tablet type information terminal 200 detects the pressure (pen pressure) applied to the pen point of the stylus 100 by receiving pressure information from the stylus 100.

The tablet type information terminal 200 and the stylus 100 in the present embodiment are connected to each other by one or a plurality of RF radio channels. The tablet type information terminal 200 and the stylus 100 in the present embodiment each have an RF (Radio frequency) unit as radio communication means for transmitting and receiving necessary information such as the above-described color information and the like, and each have a radio link determining section or circuit, which determines whether or not a mutual radio link is established by the RF units. The RF units in the present embodiment use short-range radio communication means of a Bluetooth (registered trademark) standard. The RF units are not limited to this, but may use communication means of a Wi-Fi (registered trademark) communication standard, may use short-range radio communication means of an NFC (Near Field Communication) standard, or may further use radio communication using infrared communication, optical communication, or the like.

In addition, as depicted in FIG. 1, the housing 1 of the stylus 100 is provided with a side switch operating section 4S that can be depressed by the user. A side switch turned on and off by operating the operating section 4S is disposed on the printed board 2. The side switch disposed in a circumferential surface of the housing 1 of the stylus 100 in the present embodiment has a configuration of an automatic reset type. A function corresponding to a mode of operation of the side switch operating section 4S is set in the tablet type information terminal 200. The function corresponding to the mode of operation of the side switch operating section 4S and set in the tablet type information terminal 200 is for example a determining function corresponding to a click operation by a pointing device such as a mouse or the like.

In the present embodiment, a presentation type (presentation pattern) of the color presenting circuit is controlled so as to provide a plurality of visual feedbacks corresponding to a setting of color information of a locus indicated by the stylus 100 and a state of operation of the stylus 100 or a state of cooperative operation of the stylus 100 and the tablet type information terminal 200, as will be described later, by monitoring the state of one or a combination of:

whether a mutual radio link is established between the stylus 100 and the tablet type information terminal 200, whether the stylus 100 is touching the position detecting sensor of the tablet type information terminal 200 (whether a pressure detected by the pressure detecting circuit of the stylus 100 is equal to or more than a predetermined value), whether a position touched by the stylus 100 is in one of the color regions of the color palette 202, and a state of operation of the side switch 4 of the stylus 100.

In addition, a user interface is improved by suitably combining the visual feedbacks by the color presenting circuit with tactile feedbacks by a vibrator.

Incidentally, in the present embodiment, when the color information is transmitted from the stylus 100 to the tablet type information terminal 200, a blinking presentation is made as a visual feedback indicating the transmission of the color information by controlling the color presenting circuit. In addition, in a case where a radio link between the stylus 100 and the tablet type information terminal 200 is not established when the color information is to be transmitted from the stylus 100 to the tablet type information terminal 200, the vibrator provided to the stylus 100 is activated for a predetermined time to notify by a tactile feedback that the radio link is not established. Incidentally, the above is an illustration of a user interface suitable in the present disclosure, and is not limited to this.

Details of an example of configuration of principal parts of the stylus 100 and the tablet type information terminal 200 and processing operation thereof will be further described in the following.

[Description of Example of Configuration of Principal Parts of Stylus 100 According to Embodiment]

Figure 2B:
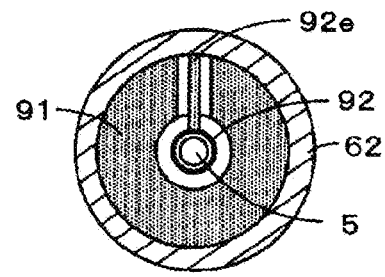
Figure 2C:
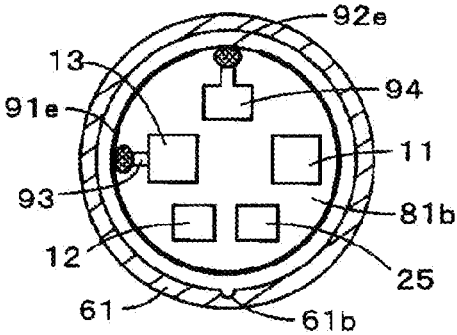

FIGS. 2A-2C illustrate an example of a mechanical configuration on the sleeve 6 side of the stylus 100. FIG. 2A is a sectional view of the sleeve 6 of the stylus 100 and vicinities thereof. FIG. 2B is a sectional view taken along a line A-A in FIG. 2A. FIG. 2C is a sectional view taken along a line B-B in FIG. 2A.

As depicted in FIG. 2A, the sleeve 6 has an external shape such that a tubular-shaped portion 61 having a constant diameter and a circular truncated cone-shaped portion 62 are coupled to each other. The sleeve 6 is formed such that the tubular-shaped portion 61 of the sleeve 6 is engaged with the housing 1 of the stylus 100. For this purpose, as depicted in FIG. 2A, an annular engaging recessed portion 61a is formed in an inner circumferential surface of the tubular-shaped portion 61 of the sleeve 6, and an annular engaging projecting portion 1a is formed on the housing 1.

In addition, in order to engage the sleeve 6 and the housing 1 with each other in a predetermined position in a rotating direction with the axial position of the stylus 100 as a center, as depicted in FIG. 2C, a recessed groove 61b is formed in an axial direction in the tubular-shaped portion 61 of the sleeve 6. Though not depicted in the figure, a projecting portion fitted into the recessed groove 61b is formed at a corresponding position of the housing 1. As depicted in FIG. 1, the sleeve 6 and the housing 1 are engaged with each other by performing alignment such that an alignment mark mk1 added to the pen point side of the housing 1 and an alignment mark mk2 added to the tubular-shaped portion 61 of the sleeve 6 abut against each other. The recessed groove 61b of the tubular-shaped portion 61 of the sleeve 6 and the projecting portion of the housing 1 are thereby aligned and engaged with each other.

Figure 3A:
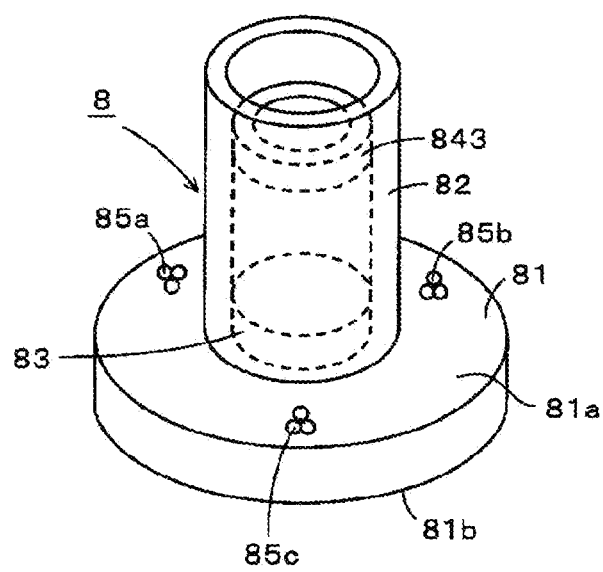
FIGS. 3A and 3B illustrate a constitution of an example of parts of the principal parts of the first embodiment of the stylus according to the present disclosure.
Figure 3B:
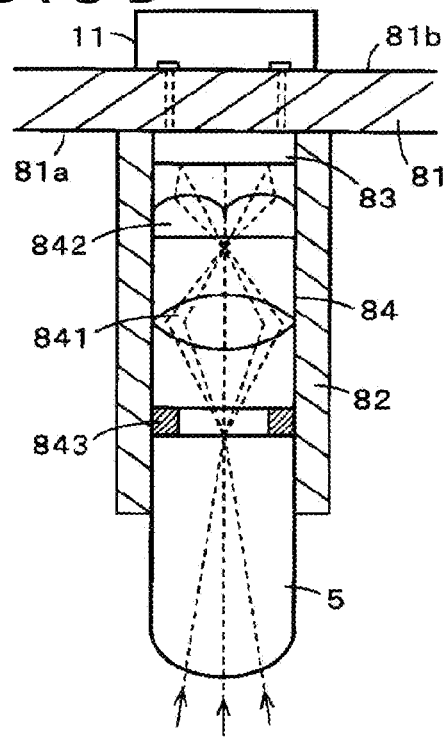

As depicted in FIG. 2A, the stylus 100 according to the present embodiment has an optical processing module 8 formed into a module part so as to include all of the color information pickup functional section, the color presenting circuit, and the pressure detecting circuit described above within a hollow portion of the sleeve 6. FIG. 3A is a perspective view of an external appearance of the optical processing module 8. In addition, FIG. 3B is a diagram of assistance in explaining an example of configuration of the parts of the color information pickup functional section and the pressure detecting circuit of the optical processing module 8.

The optical processing module 8 has, for example, a disk-shaped portion 81 and a tubular body portion 82 integrally formed of a resin. The tubular body portion 82 is provided on the center of one surface 81a of the disk-shaped portion 81. The inside diameter of the tubular body portion 82 is slightly larger than the outside diameter of the core body 5. The opposite side from the pen point side of the core body 5 is inserted into the tubular body portion 82.

An imager 83 as an example of the optical sensor is disposed in a bottom portion of a hollow portion of the tubular body portion 82. The imager 83 in the present example is formed by a CCD (Charge Coupled Device). The disk-shaped portion 81 in the present example has a role of a printed board. As depicted in FIG. 2C and FIG. 3B, an IC (Integrated Circuit) 11 including a processing circuit for an image signal output from the imager 83 is provided on a surface 81b of the disk-shaped portion 81, which is on the opposite side from the surface 81a on which the tubular body portion 82 is formed. As depicted in FIG. 3B, output terminals of the imager 83 are electrically connected to the IC 11 via through holes formed in the disk-shaped portion 81.

An optical system mechanism section 84 for guiding incident light to the light receiving surface of the imager 83 is provided on the incident light side of the imager 83 in the hollow portion of the tubular body portion 82. The optical system mechanism section 84 in the present embodiment has a configuration using an optical system mechanism section for autofocus of a photographing device. An autofocus method used in this case is referred to as a phase difference detecting method. The optical system mechanism section 84 includes a photographing lens 841 and a separator lens 842. The photographing lens 841, the separator lens 842, and the imager 83 are provided so as to be arranged in this order within the hollow portion of the tubular body portion 82 as viewed from the incident light side.

Further, in the present embodiment, for example a ring-shaped elastic body 843 formed of an elastic rubber or the like is disposed in a position farther toward the incident light side than the photographing lens 841 within the hollow portion of the tubular body portion 82. As depicted in FIG. 3B, the core body 5 is inserted in the inside of the hollow portion of the tubular body portion 82 in a state of abutting against the ring-shaped elastic body 843.

The core body 5 in the present example is formed of an optically transparent member, for example an optically transparent resin. Therefore, as indicated by a dotted line in FIG. 3B, incident light is guided through the core body 5 at the pen point of the stylus 100 to the optical system mechanism section 84 in the tubular body portion 82 of the optical processing module 8, and is made incident on the light receiving surface of the imager 83.

Hence, by detecting color information included in an image signal from the imager 83 in the IC 11, the stylus 100 can pick up a color at the position of the incident light.

In addition, by analyzing the image signal from the imager 83 in the IC 11, the stylus 100 can detect a pressure (pen pressure) applied to the core body 5. Principles of the pressure (pen pressure) detection will next be described.

Figure 4:
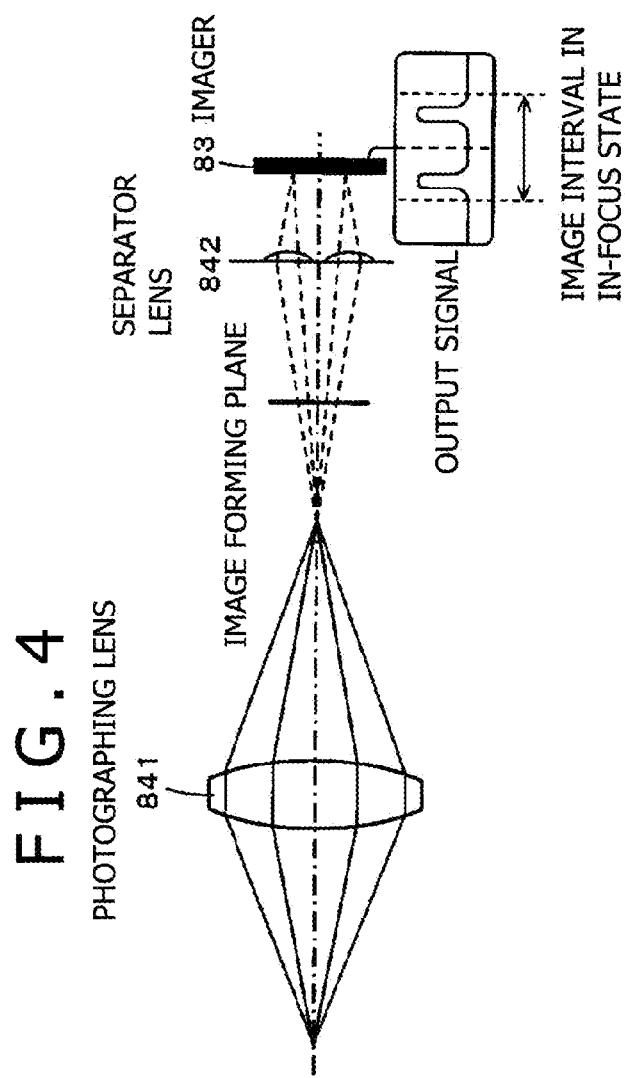
FIG. 4 is a diagram of assistance in explaining an example of a pressure detecting circuit used in the first embodiment of the stylus according to the present disclosure.

An autofocus method using a phase difference detecting method in a photographing device will first be described with reference to FIG. 4. As depicted in FIG. 4, the phase difference detecting method generates, by the separator lens 842, two images on the imager 83 from subject image information input through the photographing lens 841, measures an interval between the two images, and detects an amount of defocus. In a case of an imaging device, autofocus is performed by controlling the position in the direction of an optical axis of the photographing lens 841 or the imager 83 so that the image interval between the two images on the imager 83 is in an in-focus state.

On the other hand, in the optical system mechanism section 84 according to the present embodiment, the position in the direction of the optical axis of the photographing lens 841 or the imager 83 is fixed, and an end portion of the core body 5 is located at the position of a subject. Accordingly, the positions in the direction of the optical axis of the photographing lens 841 and the separator lens 842 of the optical system mechanism section 84 with respect to the imager 83 are adjusted in advance so that the image interval between the two images generated on the imager 83 when no pressure (pen pressure) is applied to the core body 5 is the image interval in the in-focus state.

Thus, when a pressure (pen pressure) is applied to the core body 5, because the elastic body 843 is deformable in the direction of the optical axis, the end portion of the core body 5 is displaced in the direction of the optical axis by an amount corresponding to the applied pressure (pen pressure). This displacement means that the position of the subject is changed. Therefore, the image interval between the two images generated on the imager 83 deviates from the image interval in the in-focus state, and an amount of the deviation corresponds to the pressure (pen pressure) applied to the core body 5.

Hence, the stylus 100 can detect the pressure (pen pressure) applied to the core body 5 by analyzing the image signal from the imager 83 in the IC 11 and detecting the amount of deviation of the image interval between the two images generated on the imager 83 from the in-focus state in the IC 11. That is, the IC 11 has a function of a pressure detecting circuit (pen pressure detecting circuit).

The optical processing module 8 also has a function of a color information presenting circuit for presenting color information picked up by the stylus 100 to the user, and presenting color information set in the tablet type information terminal 200 in response to an instruction input of the stylus 100 to the user.

Specifically, as depicted in FIG. 2A and FIG. 3A, a plurality of color light emitting units, or three color light emitting units 85a, 85b, and 85c in the present example are provided on the surface 81a of the disk-shaped portion 81 of the optical processing module 8, and the tubular body portion 82 is formed on the surface 81a. Each of the color light emitting units 85a, 85b, and 85c is formed by three LEDs that emit light of each of three primary colors of red, blue, and green. The emission intensity of each of the three LEDs is controlled, so that light of an arbitrary color can be emitted by combining light of the three colors. Incidentally, while a plurality of color light emitting units are provided in the present example, the number of color light emitting units may be one. In addition, the number of the plurality of color light emitting units is not limited to three, but may be two, or may be more than three, of course. Incidentally, the plurality of color light emitting units are desirably arranged at equal intervals on an identical concentric circle on the surface 81a of the disk-shaped portion 81.

A color light emission control circuit 12 that supplies a color light emission control signal corresponding to a light emission color to the three color light emitting units 85a, 85b, and 85c is provided on the surface 81b of the disk-shaped portion 81 of the optical processing module 8 as depicted in FIG. 2C. The three color light emitting units 85a, 85b, and 85c are electrically connected to the color light emission control circuit 12 via through holes formed in the disk-shaped portion 81, not depicted in the figure.

In order to present the color light emitted by the three color light emitting units 85a, 85b, and 85c to the outside, the sleeve 6 in the present embodiment is formed of an optically transparent and light scattering material, for example an optically transparent and light scattering resin. The surface 81a of the disk-shaped portion 81 of the optical processing module 8 and the side circumferential surface of the tubular body portion 82 are mirror-finished to reflect the color light emitted by the color light emitting units 85a, 85b, and 85c.

The stylus 100 according to the present embodiment has the configuration of an active capacitive pen, as described earlier, and thus transmits a signal to the position detecting sensor of the position detecting device 201. Electrodes 91 and 92 for this purpose are formed on the inner wall surface of the sleeve 6 in the stylus 100 according to the present embodiment.

The electrode 91 is formed mainly on an inclined surface of the circular truncated cone shape of the hollow portion of the sleeve 6. The electrode 92 is formed on the inner wall surface of the through hole into which the core body 5 of the sleeve 6 is inserted. The electrode 92 is not electrically connected to the electrode 91. In the present embodiment, a transmission signal from a transmission signal generating circuit 13 is supplied to the electrode 91, and the electrode 92 is grounded. The stylus 100 thereby transmits a signal to the position detecting sensor of the position detecting device 201.

In this case, in order to be able to make color presentation by the light emission of the color light emitting units 85a, 85b, and 85c via the sleeve 6, for example a transparent electrode such as ITO (Indium Tin Oxide) or the like is used as the electrode 91. For example a transparent electrode such as ITO (Indium Tin Oxide) or the like is desirably used also as the electrode 92. However, the electrode 92 has a small effect on the color presentation by the light emission. Thus, the electrode 92 does not need to be a transparent electrode.

In the present embodiment, the sleeve 6 is for example formed as an injection molded product formed by using a resin, and the electrodes 91 and 92 are formed as a conductive three-dimensional fine pattern on the inner wall surface of the sleeve 6. A method of forming the electrodes 91 and 92 is not limited to the method in the present example; a conductive metallic film may be deposited, or printing may be performed.

As depicted in FIG. 2A and FIG. 2C, the electrode 91 is formed so as to extend not only on the circular truncated cone-shaped portion 62 but also on the tubular-shaped portion 61. Therefore, an extension 91e of the electrode 91 on the tubular-shaped portion 61 is exposed on the side of the surface 81b of the disk-shaped portion 81 of the optical processing module 8. As depicted in FIG. 2C, the electrode 91 is soldered to a conductor pattern 93 connected to a signal output terminal of the transmission signal generating circuit 13 (see an elliptic part in FIG. 2C).

In addition, as depicted in FIG. 2B, the electrode 91 is formed on the inner wall surface of the sleeve 6, in a region from the entire circumferential surface and having a predetermined width, excluding a region having a predetermined area in the axial direction of the core body 5. As depicted in FIG. 2B and FIG. 2C, within the region in which the electrode 91 is not formed, an extension 92e of the electrode 92 is formed so as to extend to the tubular-shaped portion 61 of the sleeve 6. The extension 92e of the electrode 92 is soldered to a grounding conductor pattern 94 on the side of the surface 81b of the disk-shaped portion 81 of the optical processing module 8 (see an elliptic part in FIG. 2C).

The conductor patterns 93 and 94 on the disk-shaped portion 81 of the optical processing module 8 are electrically connected to the electrodes 91 and 92, respectively, by soldering, and also the optical processing module 8 is thereby physically fixed to the sleeve 6. Incidentally, the circumferential surface of the disk-shaped portion 81 of the optical processing module 8 may be bonded to the tubular-shaped portion 61 of the sleeve 6.

As will be described later, the stylus 100 according to the present embodiment includes the IC 11, the color light emission control circuit 12, the transmission signal generating circuit 13, the vibrator 25, and the like. As depicted in FIG. 2C, the IC 11, the color light emission control circuit 12, the transmission signal generating circuit 13, and the vibrator 25 are provided on the side of the surface 81b of the disk-shaped portion 81 of the optical processing module 8. As described earlier, the stylus 100 according to the present embodiment further includes an RF unit as radio communication means. Though not depicted in FIG. 2C, this RF unit is also provided on the surface 81b of the disk-shaped portion 81.

<Example of Configuration of Position Detecting Device 201>

Description will next be made of an example of configuration of the position detecting device 201 according to the first embodiment, which is used together with the stylus 100 described above.

Figure 5:
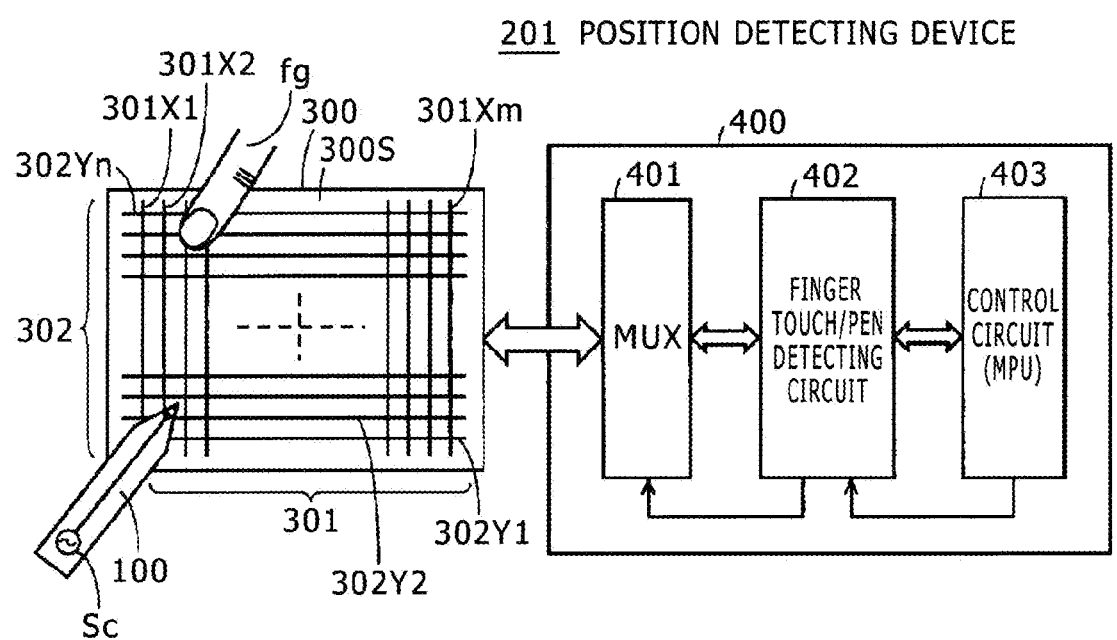
FIG. 5 is a diagram of assistance in explaining an example of configuration of a position detecting device for use in conjunction with the first embodiment of the stylus according to the present disclosure.

FIG. 5 is a diagram of assistance in explaining an example of general configuration of the position detecting device 201 according to the present embodiment. The position detecting device 201 in the present example has the configuration of a capacitance type position detecting device. The position detecting device 201 includes a position detecting sensor 300 of a so-called cross point (mutual capacitance) configuration. The position detecting device 201 is configured to supply a transmission signal to a conductor disposed in a first direction, and receive a signal from a conductor disposed in a second direction different from the first direction, when detecting a capacitive touch by a finger or the like, or a multi-touch in particular. In addition, in a case where an indicator is an active capacitive pen such as the stylus 100 described above or the like, the active capacitive pen includes an electric circuit for transmitting a position indication signal and a driving power supply for driving the electric circuit, and the position detecting device 201 is configured to receive a signal from each conductor arranged in the first direction and the second direction. Incidentally, principles of a position detecting device of a cross point type capacitance system and the like are described in detail in Japanese Patent Laid-Open No. 2011-3035, Japanese Patent Laid-Open No. 2011-3036, Japanese Patent Laid-Open No. 2012-123599, and the like, which are laid-open publications of applications by the applicant of the present application.

As depicted in FIG. 5, the position detecting device 201 according to the present embodiment includes the position detecting sensor 300 and a control device section 400.

Figure 8:
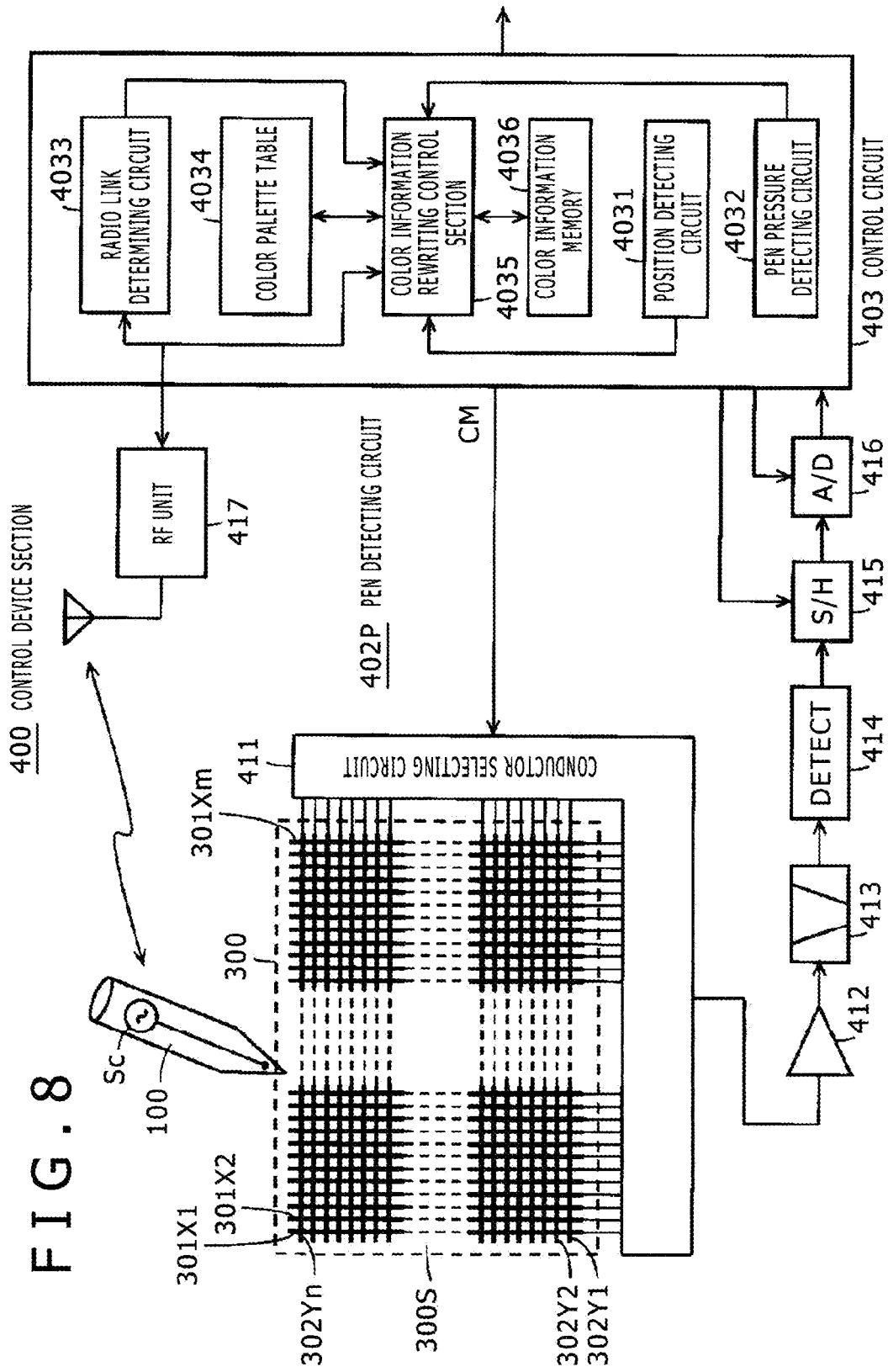
FIG. 8 is a diagram depicting an example of configuration of the position detecting device for use in conjunction with the first embodiment of the stylus according to the present disclosure.

The position detecting sensor 300 in the present example is formed by laminating a Y-conductor group 302, an insulating layer, and an X-conductor group 301 in order from a lower layer side. The position detecting sensor 300 has a grid configuration in which the X-conductor group 301 and the Y-conductor group 302 intersect each other in directions orthogonal to each other. As depicted in FIG. 5 and FIG. 8 to be described later, the Y-conductor group 302 is for example formed by arranging a plurality of Y-conductors 302Y1, 302Y2, ..., 302Yn (n is an integer of one or more) so as to extend in a horizontal direction (X-axis direction) in parallel with each other at predetermined intervals therebetween. In addition, the X-conductor group 301 is formed by arranging a plurality of X-conductors 301X1, 301X2, ..., 301Xm (m is an integer of one or more) so as to extend in a vertical direction (Y-axis direction) intersecting the Y-conductors 302Y1, 302Y2, ..., 302Yn, or orthogonal to the Y-conductors 302Y1, 302Y2, ..., 302Yn in the present example, in parallel with each other at predetermined intervals therebetween.

In the position detecting sensor 300 according to the present embodiment, the plurality of X-conductors 301X1, 301X2, ..., 301Xm constituting the X-conductor group 301 are first conductors, and the plurality of Y-conductors 302Y1, 302Y2, ..., 302Yn constituting the Y-conductor group 302 are second conductors. The position detecting device 201 thus has a configuration for detecting a position indicated by an indicator such as a finger fg, the stylus 100 constituting an active capacitive pen, or the like by using a sensor pattern formed by making the X-conductors and the Y-conductors intersect each other.

The position detecting sensor 300 of the position detecting device 201 according to the present embodiment has a size corresponding to the size of the display screen provided to the electronic apparatus. An indicating input surface (sensor surface) 300S with a screen size of about four inches, for example, is formed by the X-conductor group 301 and the Y-conductor group 302 having optical transparency.

Incidentally, the X-conductor group 301 and the Y-conductor group 302 may each be arranged on the same surface side of a sensor substrate, or the X-conductor group 301 may be arranged on one surface side of the sensor substrate and the Y-conductor group 302 may be arranged on the other surface side of the sensor substrate.

The control device section 400 includes a multiplexer 401 as an input-output interface with the position detecting sensor 300, a finger touch/pen detecting circuit 402, and a control circuit 403.

Figure 6:
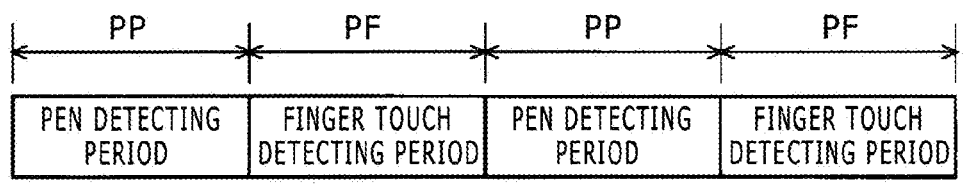
FIG. 6 is a diagram of assistance in explaining processing operation of the position detecting device for use in conjunction with the first embodiment of the stylus according to the present disclosure.

The control circuit 403 is to control operation of the position detecting device 201. The control circuit 403 is formed by an MPU (microprocessor unit) in the present example. The position detecting device 201 according to the present embodiment performs control to detect a finger touch and detect a pen touch by the stylus 100 or the like on a time-division basis. Specifically, as depicted in FIG. 6, the position detecting device 201 according to the present embodiment carries out a pen detecting period PP of detecting a pen touch and a finger touch detecting period PF of detecting a finger touch alternately on a time-division basis.

The control circuit 403 performs switching control of the multiplexer 401 and the finger touch/pen detecting circuit 402 in finger touch detecting periods PF and pen detecting periods PP.

In a finger touch detecting period, capacitances at respective points of intersection in the sensor pattern of the position detecting sensor 300 having the grid configuration formed by making the X-conductors and the Y-conductors intersect each other change at a position touched by a finger. Thus, by detecting the change in the capacitance, the control device section 400 detects the position touched by the finger.

In addition, in a pen detecting period PP, the control device section 400 detects a signal Sc transmitted from the stylus 100 by the position detecting sensor 300. The control device section 400 receives the signal Sc from the stylus 100 by not only the X-conductor group 301 (first conductors: X-conductors) but also the Y-conductor group 302 (second conductors: Y-conductors) of the position detecting sensor 300. The control device section 400 measures the level of the signal Sc transmitted from the stylus 100 in relation to each of the conductors constituting the first conductors and the second conductors, and identifies each of a first conductor and a second conductor whose received signal is at a high level. The control device section 400 thereby detects an indication by the stylus 100 on the position detecting sensor 300.

In addition, in a state in which the stylus 100 abuts against the sensor surface 300S of the position detecting sensor 300, the position detecting device 201 detects the position indicated by the stylus 100 on the position detecting sensor 300, and receives data corresponding to a pen pressure applied to the core body 5 of the stylus 100 and thereby detects the pen pressure. Incidentally, by monitoring this pen pressure, the position detecting device 201 detects whether or not the stylus 100 is touching the position detecting sensor 300 with a predetermined pen pressure or more.

[Example of Configuration of Signal Processing Circuit of Stylus 100]

Figure 7:
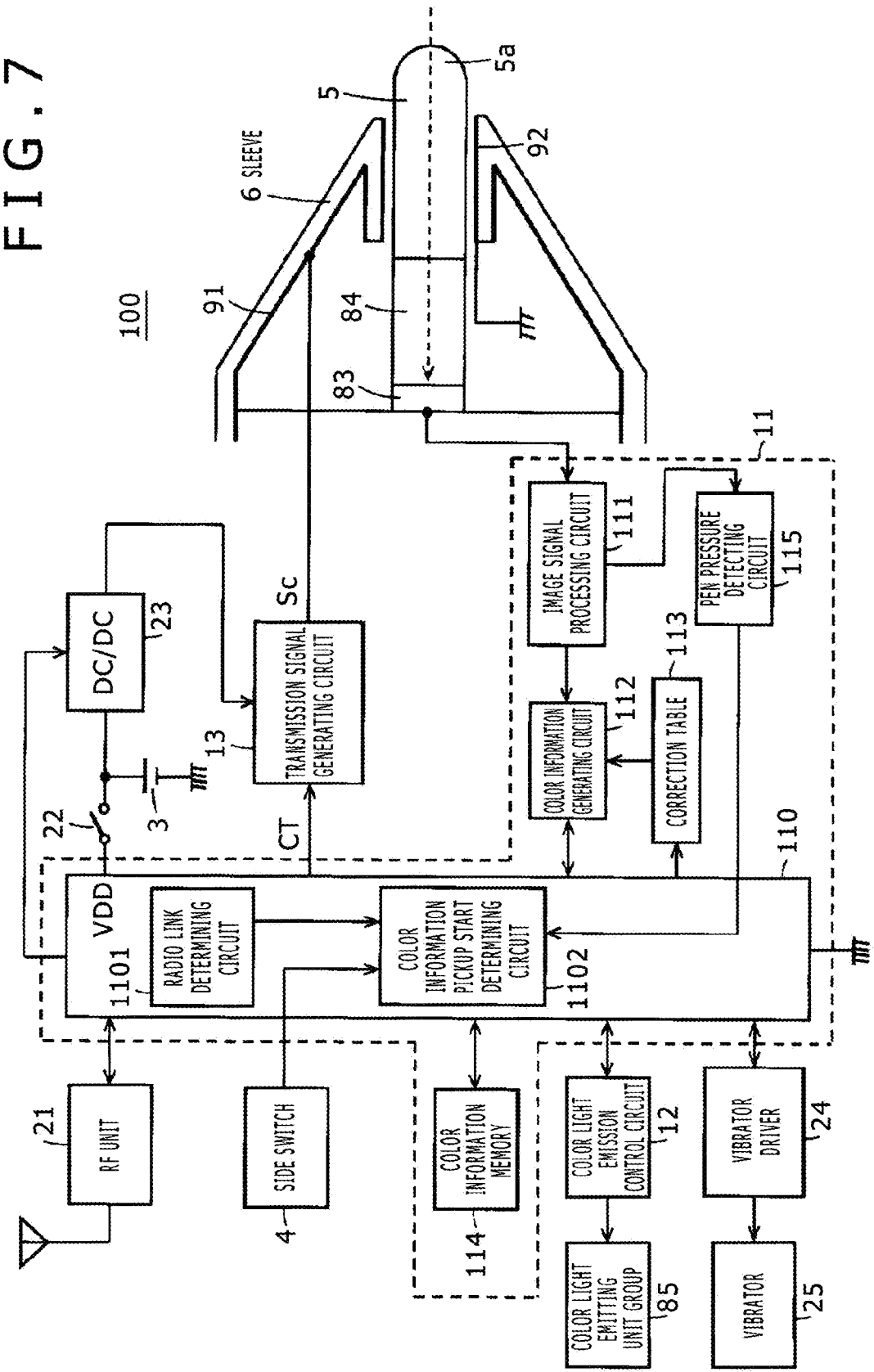
FIG. 7 is a block diagram depicting an example of configuration of a signal processing circuit of the first embodiment of the stylus according to the present disclosure.

FIG. 7 is a block diagram depicting an example of configuration of a signal processing circuit of the stylus 100 according to the first embodiment. The signal processing circuit of FIG. 7 includes not only the circuit parts provided on the optical processing module 8 but also the circuit parts formed on the printed board 2 and other circuit parts not described above.

As depicted in FIG. 7, in the signal processing circuit of the stylus 100, the IC 11 described above is connected with the color light emission control circuit 12 and the transmission signal generating circuit 13, and connected with the side switch 4, an RF unit 21, a power supply switch 22, and a vibrator driver 24. A DC-to-DC converter 23 is connected to the IC 11 through the power supply switch 22. In addition, the vibrator 25 is connected to the vibrator driver 24, and a color light emitting unit group 85 is connected to the color light emission control circuit 12. The color light emitting unit group 85 includes the three color light emitting units 85a, 85b, and 85c.

The IC 11 in the present example includes a controller 110, an image signal processing circuit 111, a color information generating circuit 112, a correction table 113, a color information memory 114, and a pen pressure detecting circuit 115. Incidentally, the IC 11 can be configured to include also the transmission signal generating circuit 13, the color light emission control circuit 12, and the vibrator driver 24.

When the power supply switch 22 is turned on, as depicted in FIG. 7, the voltage of the battery 3 is applied as a power supply voltage VDD to the IC 11. That is, though not depicted in FIG. 7, the power supply voltage VDD is applied not only to the controller 110, but also to various parts of the IC 11. Incidentally, it is needless to say that the power supply switch 22 is provided on the casing 1 of the stylus 100 so as to be operable by the user, though not depicted in the figure.

When the power supply voltage VDD is applied, the controller 110 of the IC 11 operates the DC-to-DC converter 23. The DC-to-DC converter 23 generates voltages at a plurality of signal levels, which serve as power supply voltages for various parts such as the transmission signal generating circuit 13 and the like, and supplies the voltages to the various parts.

The controller 110 within the IC 11 is formed by a microprocessor, for example. The controller 110 is supplied with the power supply voltage VDD, and generates a control signal CT to drive the transmission signal generating circuit 13.

The transmission signal generating circuit 13 in the first embodiment has an oscillation circuit that generates an alternating-current signal having a predetermined frequency f1, for example frequency f1=1.8 MHz. The controller 110 performs on-off control of the oscillation circuit by supplying the control signal CT to the oscillation circuit constituting the transmission signal generating circuit 13. Therefore, the oscillation circuit constituting the transmission signal generating circuit 13 interrupts the alternating-current signal to be generated according to the control signal CT from the controller 110, and the transmission signal generating circuit 13 thereby generates a signal Sc formed by an ASK (Amplitude Shift Keying) modulated signal. That is, the controller 110 controls the oscillation circuit constituting the transmission signal generating circuit 13, whereby the transmission signal generating circuit 13 generates the ASK modulated signal. In place of ASK modulation, the signal generated in the transmission signal generating circuit 13 may be an OOK (On Off Keying) modulated signal, an FSK (Frequency Shift Keying) modulated signal, or another modulated signal.

In the present embodiment, under control of the control signal CT from the controller 110, the transmission signal generating circuit 13 generates, as the ASK modulated signal, the signal Sc including a continuous transmission signal (burst signal) for not only making the position detecting device 201 detect a position indicated by the stylus 100 but also enabling the position detecting device 201 to perform signal demodulation in synchronism with signal transmission timing of the signal transmitted from the stylus 100, and including necessary additional information. In the present embodiment, the controller 110 controls the transmission signal generating circuit 13 so as to add a pen pressure value detected by the pen pressure detecting circuit 115 and information on operation of the side switch 4 as the additional information to the output signal Sc. The transmission signal generating circuit 13 transmits the generated transmission signal to the position detecting sensor of the position detecting device 201 through the electrode 91.

The parts of the controller 110, the image signal processing circuit 111, the color information generating circuit 112, the correction table 113, and the color information memory 114 within the IC 11 constitute a color information pickup functional section and a color information retaining functional section.

Specifically, the image signal processing circuit 111 receives an image signal from the imager 83 provided in the optical processing module 8. The image signal processing circuit 111 then extracts color information from the image signal from the imager 83, and supplies the color information to the color information generating circuit 112. Using correction information stored in the correction table 113 provided so that the color light emitting units 85a, 85b, and 85c of the color light emitting unit group 85 emit light in a color faithful to the color information extracted from the image signal from the imager 83, the color information generating circuit 112 makes the color light emitting units 85a, 85b, and 85c of the color light emitting unit group 85 emit light in a color corresponding to the color information of the light information picked up from the imager 83, and generates color information with which to display a drawing locus of the stylus 100 on the display screen 200D of the display of the tablet type information terminal 200.

The correction table 113 includes first conversion table data for making color correction between the color information picked up from the imager 83 and the color information with which the color light emitting units 85a, 85b, and 85c of the color light emitting unit group 85 emit light, and includes second conversion table data for making color correction between the color information picked up from the imager 83 and the color information of the display screen 200D of the display of the tablet type information terminal 200. The correction table 113 thereby improves color reproducibility of each of the color light emitting units 85a, 85b, and 85c of the color light emitting unit group 85 and the display screen 200D of the display of the tablet type information terminal 200.

The controller 110 performs switching control of the first conversion table data and the second conversion table data of the correction table 113. When the controller 110 switches the correction table 113 to the first conversion table data, the controller 110 supplies the color information from the color information generating circuit 112 to a buffer memory of the color light emission control circuit 12, and makes the buffer memory of the color light emission control circuit 12 store the color information. In addition, when the controller 110 switches the correction table 113 to the second conversion table data, the controller 110 supplies the color information from the color information generating circuit 112 to the color information memory 114, and makes the color information memory 114 store the color information.

The light emission of the three color light emitting units 85a, 85b, and 85c constituting the color light emitting unit group 85 is controlled according to the color information stored in the buffer memory of the color light emission control circuit 12. The color light emission control circuit 12 and the color light emitting unit group 85 constitute a color presenting circuit.

For correction of the color information stored in the color information memory 114 at a time of light emission presented by the color presenting circuit formed by the color light emission control circuit 12 and the color light emitting unit group 85, the correction table 113 also includes conversion table data (third conversion table data) for conversion between the color information stored in the color information memory 114 and the color information stored in the buffer memory of the color light emission control circuit 12. When the color presenting circuit presents the color information stored in the color information memory 114 as a light emission color, the controller 110 sends the color information stored in the color information memory 114 to the color information generating circuit 112, and controls the correction table 113 into a state of using the third conversion table data. Then, the controller 110 obtains the color information converted on the basis of the third conversion table data of the correction table 113 from the color information generating circuit 112, and writes the color information to the buffer memory of the color light emission control circuit 12. The color light emitting units 85a, 85b, and 85c of the color light emitting unit group 85 thereby present a light emission color corresponding to the color information stored in the color information memory 114.

In addition, as described earlier, the image signal processing circuit 111 detects an image interval between two images generated by the separator lens 842 of the optical system mechanism section 84, and supplies information on the detected image interval to the pen pressure detecting circuit 115. Then, the pen pressure detecting circuit 115 performs pen pressure detection processing as follows, and supplies the detection result to the controller 110.

In the present embodiment, when the input image interval is an image interval at an in-focus position, the pen pressure detecting circuit 115 detects the input image interval as a position (pen pressure of zero) at which a tip 5a of the core body 5 of the stylus 100 is in contact with a predetermined region such as the input surface of the position detecting sensor or the like.

When the input image interval is narrower than the image interval at the in-focus position, the pen pressure detecting circuit 115 detects that the stylus 100 is in a state of being present up in the air without being in contact with the predetermined region such as the input surface of the position detecting sensor or the like (so-called hovering state), and that the stylus 100 is present at a height position corresponding to an amount of deviation from the image interval at the in-focus position.

Further, when the input image interval is wider than the image interval at the in-focus position, the pen pressure detecting circuit 115 detects that the stylus 100 is in contact with the predetermined region such as the input surface of the position detecting sensor or the like, and that a pressure (pen pressure) corresponding to an amount of deviation from the image interval at the in-focus position is applied to the stylus 100.

As described earlier, the RF unit 21 is to form a radio link with the tablet type information terminal 200. The controller 110 transmits a signal for forming the radio link from the RF unit 21 when the power supply switch 22 is on, and has a function of a radio link determining circuit 1101 that determines whether or not the radio link with the tablet type information terminal 200 is formed, by monitoring a signal received by the RF unit 21.

The controller 110 also has functions of a color information pickup functional section and a color information retaining functional section as well as a color information pickup start determining circuit 1102 that determines whether or not to start the color presenting circuit.

The color information pickup start determining circuit 1102 in the present embodiment is supplied with a determination result of the radio link determining circuit 1101, and is supplied with an operation signal when the side switch 4 is operated and with a pen pressure detection result of the pen pressure detecting circuit 115. Incidentally, the side switch 4 or the pen pressure detecting circuit 115 constitutes a trigger signal generating circuit. The operation signal when the side switch 4 is operated and the pen pressure detection result of the pen pressure detecting circuit 115 are each supplied to the color information pickup start determining circuit 1102 as an example of a trigger signal for a start of processing of color information pickup and color information retention as well as color information presentation. Incidentally, in the present example, an operation mode representing a start of processing of color information pickup and color information retention as well as color information presentation, for example a long depressing operation, is set for the side switch 4.

When the radio link determining circuit 1101 determines that the radio link with the tablet type information terminal 200 is not established, and the pen pressure detecting circuit 115 detects a pen pressure equal to or more than zero, the color information pickup start determining circuit 1102 performs control so as to start the processing of color information pickup and color information retention as well as color information presentation.

In addition, when the radio link determining circuit 1101 determines that the radio link with the tablet type information terminal 200 is established, and when the pen pressure detecting circuit 115 detects a pen pressure equal to or more than zero and the color information pickup start determining circuit 1102 determines that the operation representing a start of processing of color information pickup and color information retention as well as color information presentation is performed on the side switch 4, the color information pickup start determining circuit 1102 performs control so as to start the processing of color information pickup and color information retention as well as color information presentation.

Then, on the basis of the signals of the radio link determining circuit and the pen pressure detecting circuit 115 or the side switch 4 constituting the trigger signal generating circuit, the controller 110 performs control so as to transmit picked-up color information to the tablet type information terminal 200 through the RF unit 21.

Incidentally, when the controller 110 picks up the color information, the controller 110 vibrates the stylus 100 by driving the vibrator 25 by the vibrator driver 24, and thereby performs tactile feedback to the user. The vibrator 25 may be driven also when color information from the tablet type information terminal 200 is received.

[Example of Configuration of Control Device Section 400 of Position Detecting Device 201]

FIG. 8 is an example of a block diagram of the control device section 400 of the position detecting device 201, and depicts an example of a configuration obtained by extracting mainly the part of a pen detecting circuit 402P. Thus, the circuit in the example of the configuration of FIG. 8 operates in pen detecting periods PP.

As depicted in FIG. 8, the pen detecting circuit 402P in the present example includes a conductor selecting circuit 411 provided to the position detecting sensor 300, an amplifying circuit 412, a band-pass filter circuit 413, a detecting circuit 414, a sample and hold circuit 415, and an analog-to-digital converting circuit (hereinafter referred to as an AD converting circuit) 416, and includes the above-described control circuit 403. The control circuit 403 in the present embodiment is connected to a display control circuit for the display of the tablet type information terminal 200, and has a function of obtaining color information at an image position corresponding to position coordinates on the position detecting sensor 300 in a color screen displayed on the display screen 200D.

Further, in the pen detecting circuit 402P, an RF unit 417 constituting a radio communication circuit is connected to the control circuit 403. The radio unit 417 is to perform radio communication with the RF unit 21 of the stylus 100. The radio unit 417 uses short-range radio communication of a Bluetooth (registered trademark) standard in the present embodiment.

The conductor selecting circuit 411 forms a part of the multiplexer 401 described above. The amplifying circuit 412, the band-pass filter circuit 413, the detecting circuit 414, the sample and hold circuit 415, and the AD converting circuit 416 form a part of the pen detecting circuit within the finger touch/pen detecting circuit 402 described above.

The conductor selecting circuit 411 selects one conductor from among the first conductors 301X1 to 301Xm and one conductor from among the second conductors 302Y1 to 302Yn on the basis of the control signal CM from the control circuit 403. The conductor selected by the conductor selecting circuit 411 is selectively connected to the amplifying circuit 412. The amplifying circuit 412 amplifies a signal from the stylus 100. The output of the amplifying circuit 412 is supplied to the band-pass filter circuit 413, where only a component of the frequency of the signal transmitted from the stylus 100 is extracted.

The output signal of the band-pass filter circuit 413 is detected by the detecting circuit 414. The output signal of the detecting circuit 414 is supplied to the sample and hold circuit 415 to be sampled and held in predetermined timing according to a sampling signal from the control circuit 403, and thereafter converted into a digital value by the AD converting circuit 416. The digital data from the AD converting circuit 416 is read by the control circuit 403, and processed by a program stored in a ROM within the control circuit 403.

Specifically, the control circuit 403 operates so as to send out a control signal to each of the sample and hold circuit 415, the AD converting circuit 416, and the conductor selecting circuit 411. Then, the control circuit 403 performs signal processing for detecting a hover state of the stylus 100, detecting position coordinates indicated by the stylus 100 on the sensor 300, detecting a pressure (pen pressure) applied to the core body 5 of the stylus 100, and detecting operation information of the side switch 4 of the stylus 100, from the digital data from the AD converting circuit 416.

Next, the following description will be made of operation when the pen detecting circuit 402P of the position detecting device 201 sets color information and exchanges color information with the stylus 100.

As depicted in FIG. 8, the control circuit 403 in the present embodiment includes a position detecting circuit 4031, a pen pressure detecting circuit 4032, a radio link determining circuit 4033, a color palette table 4034, and a color information rewriting control section 4035 as software processing functions based on a software program, and includes a color information memory 4036.

The position detecting circuit 4031 detects a position indicated by the stylus 100 from the digital data from the AD converting circuit 416, as described earlier. In addition, the pen pressure detecting circuit 4032 detects information on a pen pressure value as additional information from the digital data from the AD converting circuit 416. The radio link determining circuit 4033 determines whether or not the radio link with the stylus 100 is established, by monitoring a signal received by the RF unit 417.

The color palette table 4034 stores correspondence table data between each of the color regions C1 to Cm of the color palette 202 depicted in FIG. 1 and corresponding color information. The color information memory 4036 stores color information of a drawing locus of the stylus 100, which is displayed on the display screen 200D.

On the basis of position information from the position detecting circuit 4031, the information on the pen pressure value from the pen pressure detecting circuit 4032, and information indicating whether or not the radio link is established from the radio link determining circuit 4033, the color information rewriting control section 4035 performs control of rewriting the color information stored in the color information memory 4036, and sends and receives color information and necessary commands to and from the stylus 100 through the RF unit 417. Detailed processing of the color information rewriting control section 4035 will be described later.

[Example of Processing Operation Related to Color Information in Stylus 100 and Tablet Type Information Terminal 200]

<Example of Processing Operations of the Stylus 100 when the Radio Link with the Tablet Type Information Terminal 200 is not Established and when the Radio Link is Established>

Figure 9:
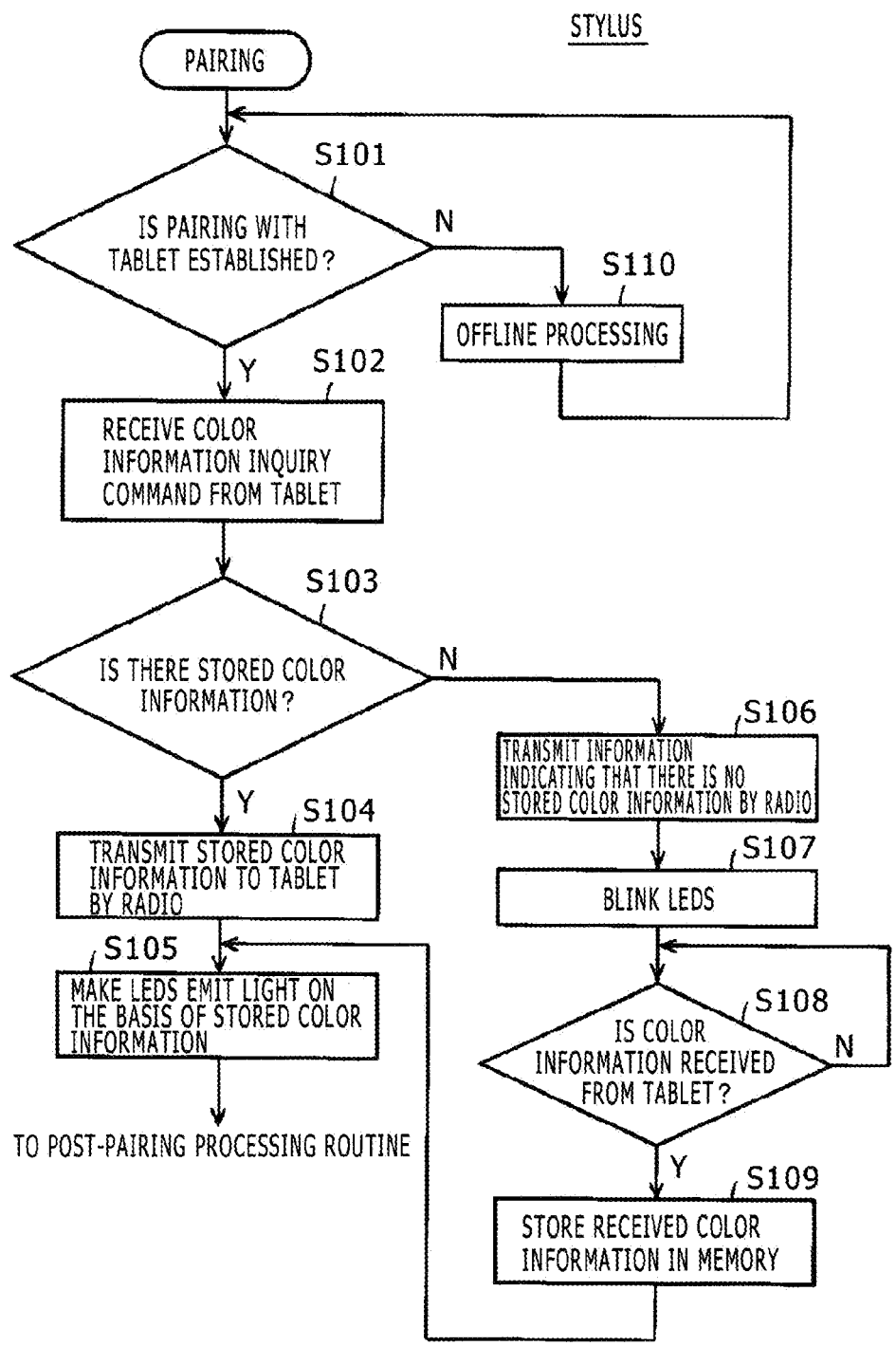
FIG. 9 is a diagram depicting a flowchart of assistance in explaining a flow of processing operation of the first embodiment of the stylus according to the present disclosure.

FIG. 9 is a flowchart depicting a flow of an example of processing operations of the stylus 100 when the radio link between the stylus 100 and the tablet type information terminal 200 is not established and when the radio link is established. Incidentally, processing of each step in this flowchart is performed mainly by the controller 110 of the IC 11.

The controller 110 of the stylus 100 determines by the radio link determining circuit 1101 whether or not the radio link with the tablet type information terminal 200 is established, that is, whether or not pairing with the tablet type information terminal 200 is established (step S101). Incidentally, in the flowchart, the tablet type information terminal 200 is written simply as a tablet for simplicity. The same is true in the following description.

When the controller 110 determines in step S101 that the radio link with the tablet type information terminal 200 is established, a color information inquiry command is sent from the tablet type information terminal 200, as will be described later. The controller 110 thus receives the color information inquiry command (step S102).

The controller 110 then determines whether or not color information is stored in the color information memory 114 (step S103).

When determining in this step S103 that color information is stored in the color information memory 114, the controller 110 transmits the stored color information to the tablet type information terminal 200 by radio (step S104).

Then, the color light emitting units 85a, 85b, and 85c of the color light emitting unit group 85 are made to emit light on the basis of the color information stored in the color information memory 114 (step S105). In this case, as described earlier, the controller 110 supplies the color information stored in the color information memory 114 to the color information generating circuit 112, and switches the correction table 113 to the third conversion table data. The controller 110 thereafter obtains the color information after conversion (after correction) from the color information generating circuit 112. The controller 110 writes the obtained color information to the buffer memory of the color light emission control circuit 12. The color light emitting units 85a, 85b, and 85c of the color light emitting unit group 85 present the color of the color information stored in the color information memory 114 in a light emission color based on the corrected color information. Thereby color reproducibility is improved.

Incidentally, in presenting this color information, the presentation by the color light emitting unit group 85 is controlled so as to be distinguishable from color presentation at a time of detection of color information by the imager 83 of the stylus 100, that is, so as to be in a presentation pattern different from a color presentation pattern at a time of detection of color information by the imager 83 of the stylus 100. For example, at a time of detection of color information by the imager 83 of the stylus 100, the color light emission control circuit 12 controls the emission intensity of the color light emitting unit group 85 so as to make the color light emitting unit group 85 emit light with the obtained color information continuously for a predetermined time, or continuously while a predetermined pen pressure is detected, whereas at a time of transmission of the color information stored in the color information memory 114 to the tablet type information terminal 200, the color light emission control circuit 12 controls the emission intensity of the color light emitting unit group 85 so as to make the color light emitting unit group 85 emit light in that color and blink at predetermined time intervals, for example. Then, after the blinking state has continued for a certain time, color presentation control of turning off the color light emitting unit group 85 is performed. Visual feedback is provided by performing such color presentation control.

The color light emission control circuit 12 controls the color light emitting unit group 85 in presentation patterns corresponding to the operating conditions of the stylus 100 and conditions as to whether or not the radio link between the stylus 100 and the tablet type information terminal 200 is established. In addition, in a case where the radio link between the stylus 100 and the tablet type information terminal 200 is not established when color information is to be transmitted from the stylus 100 to the tablet type information terminal 200, tactile feedback is provided by activating the vibrator 25 for a predetermined time to indicate that the radio link is in an unestablished state.

When determining in step S103 that there is no color information stored in the color information memory 114, the controller 110 transmits, by radio, information indicating that there is no stored color information to the tablet type information terminal 200 through the RF unit 21 (step S106). Then, to indicate that the color information memory 114 does not store color information, the controller 110 controls the color light emitting unit group 85 by the color light emission control circuit 12 so as to provide a presentation pattern different from the other presentation patterns, for example a presentation pattern that is set to a specific color such as white or the like as a light emission color and that is made to blink. Visual feedback is thus provided (step S107).

Next, to determine whether or not there is color information to be received from the tablet type information terminal 200, the controller 110 waits for reception of color information from the tablet type information terminal 200 by the RF unit 21 (step S108). When color information from the tablet type information terminal 200 is received, the controller 110 stores the received color information in the color information memory 114 (step S109). The controller 110 then proceeds to step S105 to make the color light emitting units 85a, 85b, and 85c of the color light emitting unit group 85 emit light on the basis of the color information stored in the color information memory 114 (step S105). Also in this case, as described earlier, the color information stored in the color information memory 114 is converted (corrected) on the basis of the third conversion table data of the correction table 113, and the converted (corrected) color information is written into the buffer memory of the color light emission control circuit 12 to control the color light emitting unit group 85. Thereby color reproducibility is improved.

Incidentally, in step S105 following step S104, at the time of transmission of the color information stored in the color information memory 114 to the tablet type information terminal 200, the color light emission control circuit 12 controls the emission intensity of the color light emitting unit group 85 so as to make the color light emitting unit group 85 emit light in that color and blink at predetermined time intervals, for example. After the blinking state has continued for a certain time, presentation control of turning off the color light emitting unit group 85 is performed. Visual feedback is thus provided. In addition, in a case where the radio link between the stylus 100 and the tablet type information terminal 200 is not established when color information is to be transmitted from the stylus 100 to the tablet type information terminal 200, tactile feedback is provided by activating the vibrator 25 for a predetermined time to indicate that the radio link is in an unestablished state.

On the other hand, in step 105 following step S109, the blinking is performed at time intervals different from the time intervals set in step 105 following step S104, or an elapsed time from the blinking to the turnoff is set, which is different from an elapsed time set in step 105 following step S104. The color light emission control circuit 12 thus controls the color light emitting unit group 85 by using presentation patterns different from each other so as to enable visual recognition of the transmission of the color information from the stylus 100 to the tablet type information terminal 200 or the transmission of the color information from the tablet type information terminal 200 to the stylus 100. Visual feedback is thus provided.

In addition, when determining in step S101 that the radio link with the tablet type information terminal 200 cannot be established (pairing cannot be established), the controller 110 performs processing in a state in which the stylus 100 and the tablet type information terminal 200 have not established the radio link (which will be referred to as offline processing) (S110).

Figure 10:
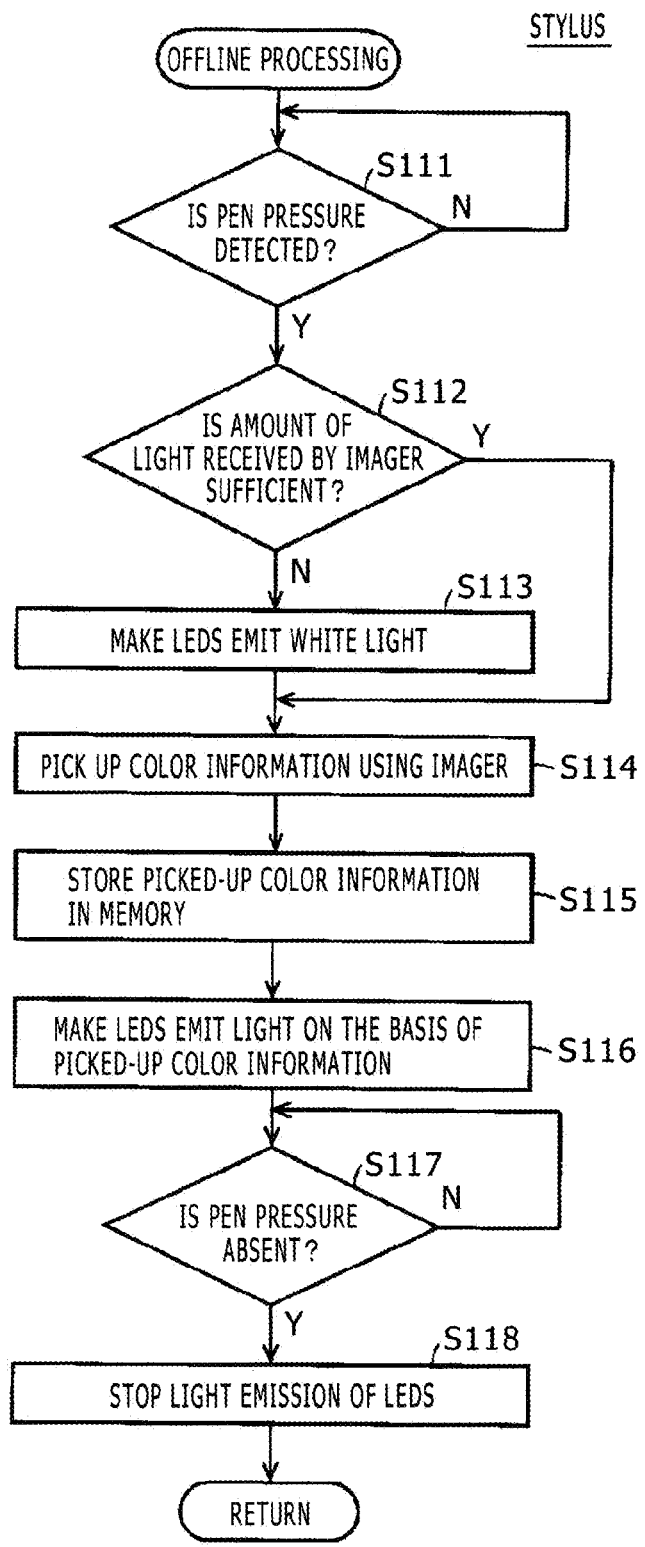
FIG. 10 is a diagram depicting a flowchart of assistance in explaining a flow of processing operation of an example of a tablet as an example of an electronic apparatus for use in conjunction with the first embodiment of the stylus according to the present disclosure.

FIG. 10 depicts an example of a flow of the offline processing in the stylus 100. In this offline processing, when a predetermined pen pressure is applied to the core body 5 of the stylus 100 by a touch operation of the user, color information at the corresponding position is obtained by activating the imager 83.

The controller 110 of the stylus 100 monitors the pen pressure value of the pen pressure detecting circuit 115 to detect whether or not the user is applying a predetermined pen pressure value equal to or more than zero to the core body 5 of the stylus 100 (step S111). When determining in this step S111 that a pen pressure equal to or more than zero is not detected, the controller 110 repeats this step S111.

When determining in step S111 that a pen pressure equal to or more than zero is detected, the controller 110 checks the level of the input signal of the image signal processing circuit 111 (output signal of the imager 83) to determine whether or not an amount of light received by the imager 83 is sufficient to pick up the color information (step S112). When determining in this step S112 that the amount of light received by the imager 83 is not sufficient to pick up the color information, the controller 110 illuminates a color information obtaining position by making the color light emitting unit group 85 emit white light by the color light emission control circuit 12, and thereby performs control so that the amount of light received by the imager 83 is sufficient to pick up the color information (step S113).

Then, the controller 110 picks up the color information at the position touched by the stylus 100 by extracting the color information from an image signal from the imager 83 in the image signal processing circuit 111 and obtaining the color information corrected by the correction table 113 in the color information generating circuit 112 (step S114). When determining in step S112 that the amount of light incident on the imager 83 is sufficient to pick up the color information, the controller 110 proceeds to step S114 without performing the light emission in step S113, and picks up the color information at the position touched by the stylus 100.

Then, the controller 110 stores the color information corrected by the second conversion table data of the correction table 113 in the color information memory 114 (step S115). In addition, the controller 110 stores the color information corrected by the first conversion table data of the correction table 113 in the buffer memory of the color light emission control circuit 12, and thereby makes the color light emitting unit group 85 emit light in a light emission color corresponding to the color information stored in the buffer memory (step S116). As a result of the color correction processing between the picked-up color information and the color light emitting unit group 85, the color light emitting unit group 85 emits light with high color fidelity (color reproducibility).

Next, the controller 110 waits to determine whether or not the pen pressure equal to or more than zero has disappeared by monitoring the pen pressure value of the pen pressure detecting circuit 115 (step S117). When determining that the pen pressure has disappeared, the controller 110 stops the light emission for color presentation by the color light emitting unit group 85 (step S118). In this step S118, the offline processing is ended. The controller 110 returns the processing to step S101 in FIG. 9 to repeat the processing from step S101 on down.

<Example of Processing Operations of the Tablet Type Information Terminal 200 when the Radio Link with the Stylus 100 is not Established and when the Radio Link Is Established>

As described earlier, the tablet type information terminal 200 according to the present embodiment detects a touch of a finger and a touch of the stylus 100 on a time-division basis. The tablet type information terminal 200 in finger touch detecting periods PF always operates so as to detect a position indicated by a finger. In pen detecting periods PP, however, when the radio link with the stylus 100 is not established, the tablet type information terminal 200 merely monitors for the establishment of the radio link with the stylus 100, and the pen detecting circuit 402P does not perform the processing of position detecting operation, pen pressure detecting operation, the setting of color information with the stylus 100, and the like.

Figure 11:
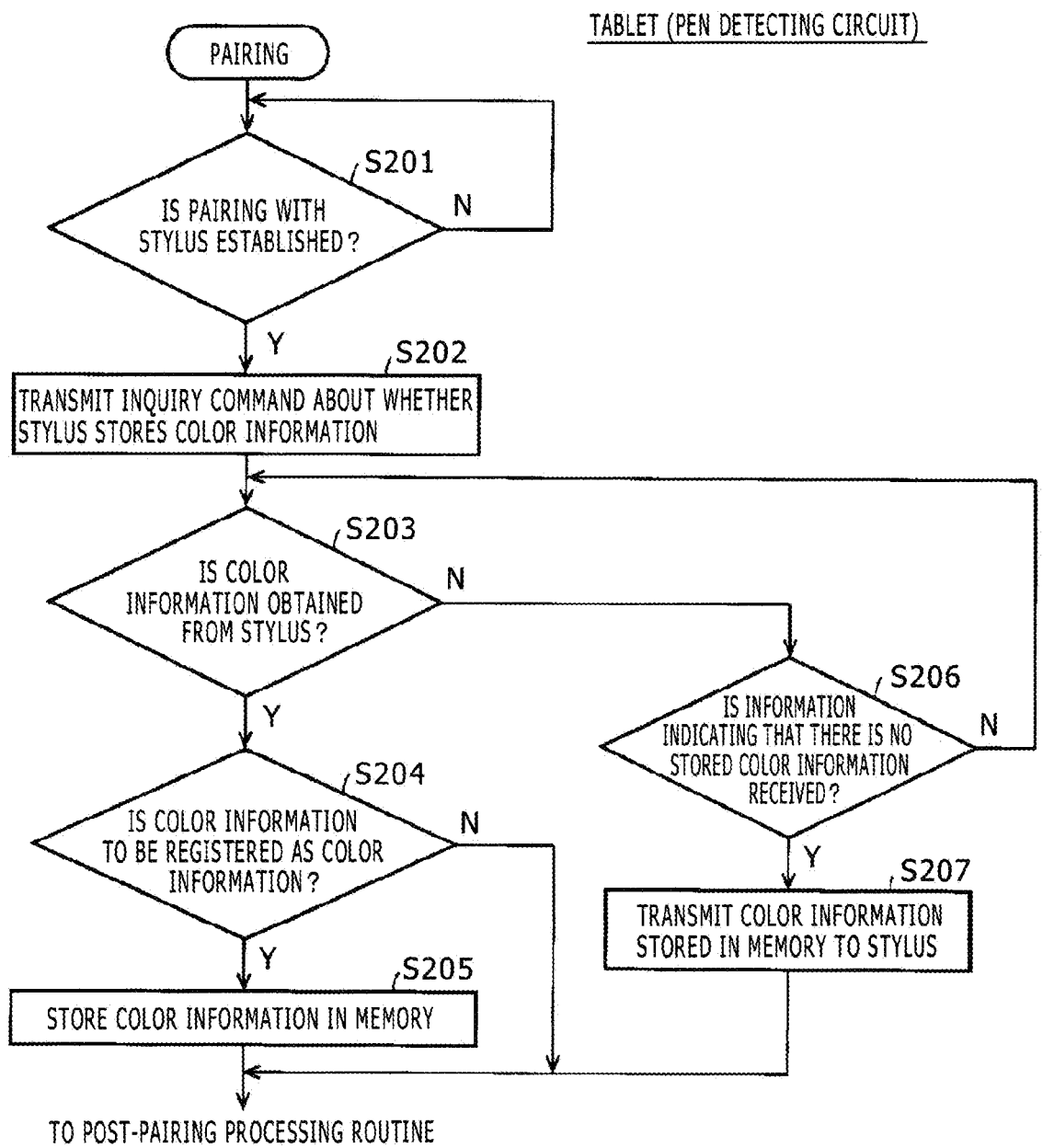
FIG. 11 is a diagram depicting a flowchart of assistance in explaining a flow of an example of processing operation in the position detecting device for use in conjunction with the first embodiment of the stylus according to the present disclosure.

FIG. 11 is a flowchart depicting a flow of an example of processing operations of the pen detecting circuit 402P of the tablet type information terminal 200 when the radio link between the tablet type information terminal 200 and the stylus 100 is not established and when the radio link is established. Incidentally, processing in each step in this flowchart is performed mainly by the control circuit 403 of the pen detecting circuit 402P described above.

The control circuit 403 determines by the radio link determining circuit 4033 whether or not the radio link with the stylus is established, that is, whether or not pairing with the stylus 100 is established (step S201). The control circuit 403 repeats this step S201 until detecting pairing with the stylus 100.

When determining in this step S201 that pairing with the stylus 100 is established, the control circuit 403 transmits an inquiry command inquiring about whether color information is stored in the color information memory 114 to the stylus 100 through the RF unit 417 (step S202).

The control circuit 403 then determines whether or not color information is obtained from the stylus 100 through the RF unit 417 (step S203). When determining in step S203 that color information is obtained from the stylus 100, the control circuit 403 determines whether to register the obtained color information as color information for drawing by indicators, by inquiring of the user about whether to register the obtained color information as color information for drawing by indicators by presenting a message, and checking a response to the inquiry (step S204).

When determining in step S204 that the color information obtained from the stylus 100 is to be registered on the basis of the response by the user, the control circuit 403 stores the obtained color information in the color information memory 4036, and registers the obtained color information as color information for drawing by indicators such as the stylus 100, a finger, and the like. The control circuit 403 thereafter proceeds to a processing routine after the pairing with the stylus 100, which will be described later. When determining in step S204 that the color information obtained from the stylus 100 is not to be registered on the basis of the response by the user, the control circuit 403 proceeds to the processing routine after the pairing with the stylus 100, which will be described later, without storing the obtained color information in the color information memory 4036.

When determining in step S203 that color information cannot be obtained from the stylus 100, the control circuit 403 determines whether or not information indicating that there is no color information stored in the stylus 100 is received from the stylus 100 (step S206). When determining in this step S206 that information indicating that there is no color information stored in the stylus 100 is not received from the stylus 100, the control circuit 403 returns the processing to step S203. When determining in this step S206 that information indicating that there is no stored color information is received from the stylus 100, the pairing with the stylus 100 is established, and in a case where color information is stored in the color information memory 4036, the control circuit 403 transmits the stored color information to the stylus 100 (step S207). The control circuit 403 thereafter proceeds to the processing routine after the pairing with the stylus 100, which will be described later.

[Description of Processing Routine after Pairing]

<Example of the Post-Pairing Processing Routine in the Stylus 100>

Figure 12:
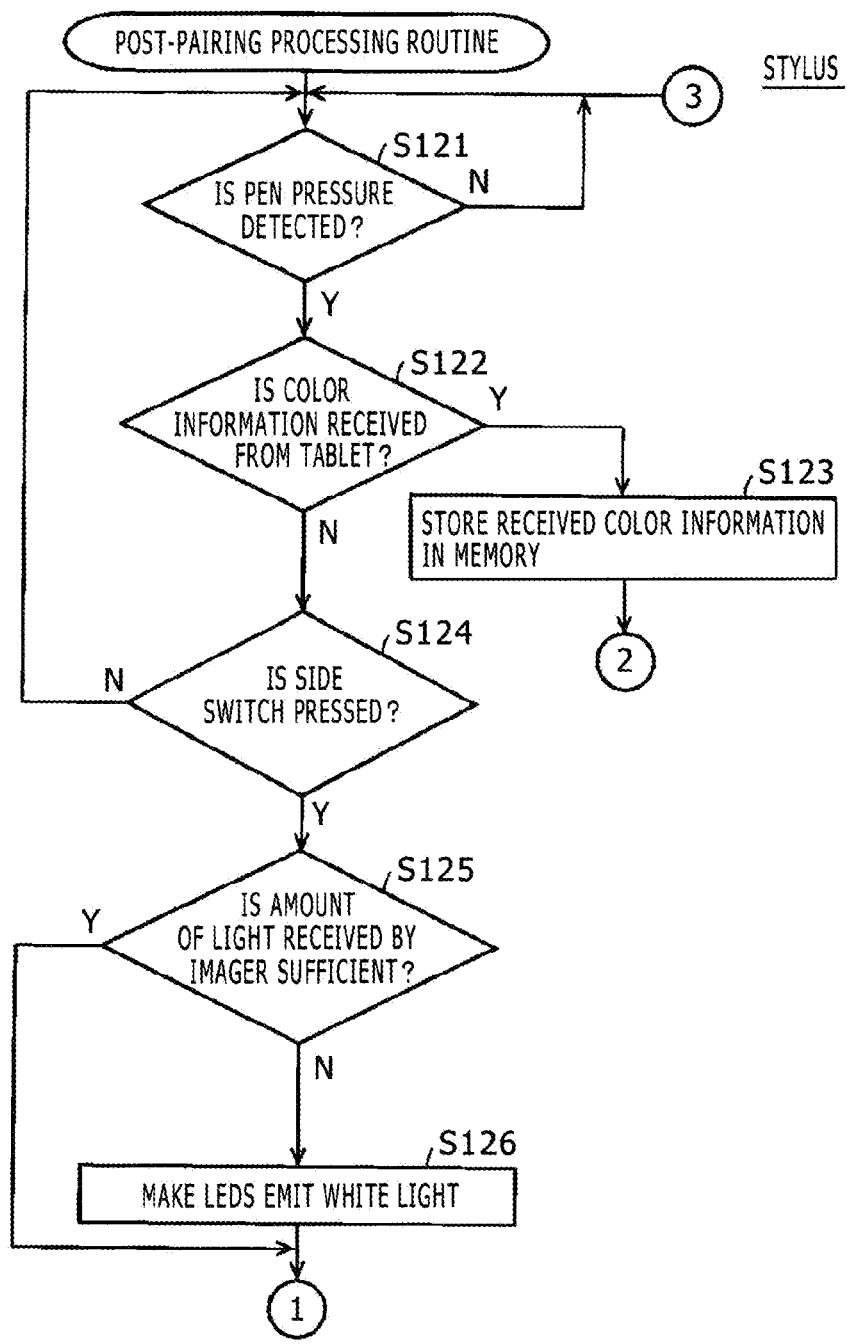
FIG. 12 is a diagram depicting a part of a flowchart of assistance in explaining a flow of processing operation of the first embodiment of the stylus according to the present disclosure.
Figure 13:
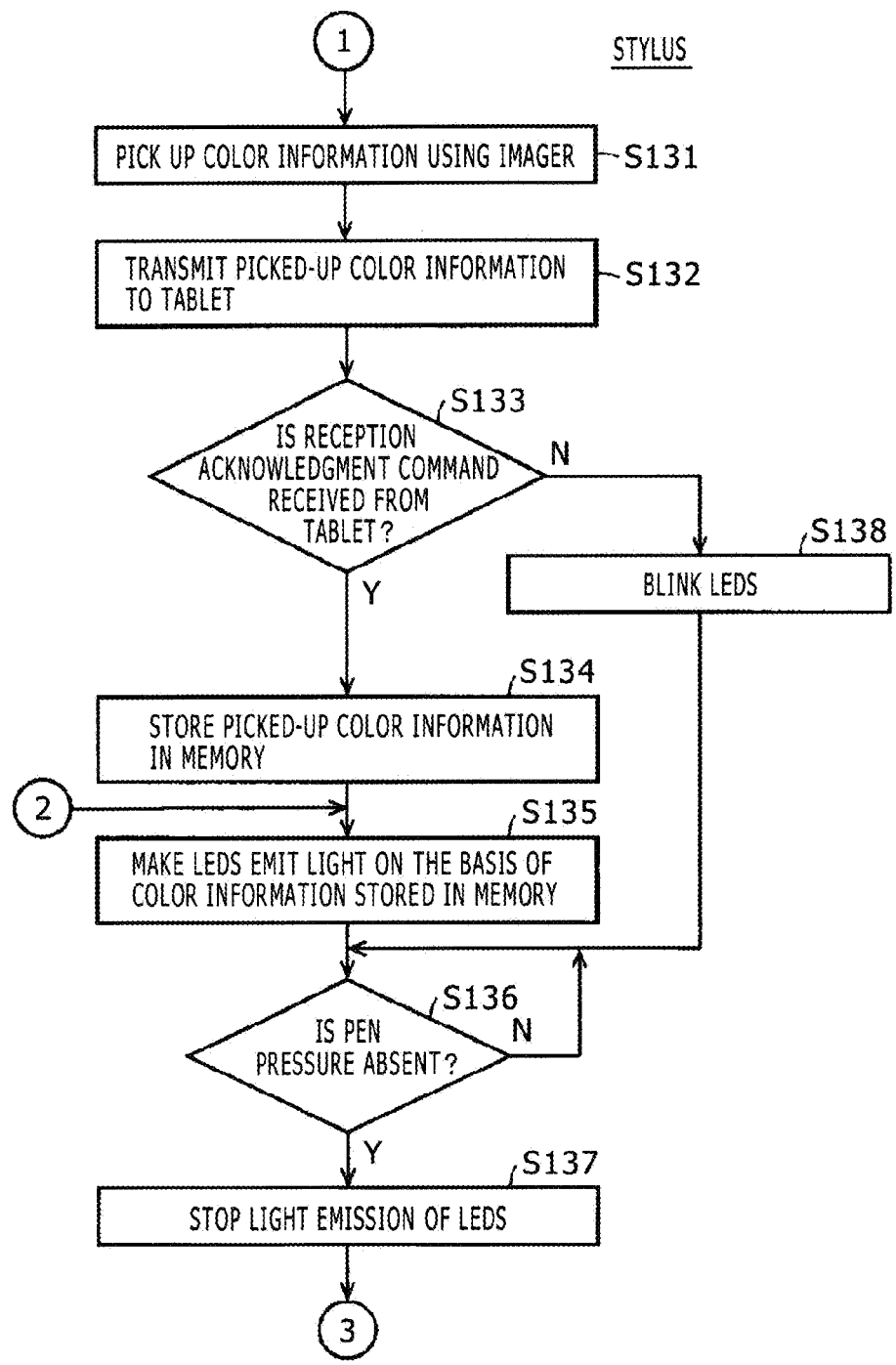
FIG. 13 is a diagram depicting a part of the flowchart of assistance in explaining the flow of the processing operation of the first embodiment of the stylus according to the present disclosure.

A flowchart of FIG. 12 and subsequent FIG. 13 illustrates an example of the post-pairing processing routine in the stylus 100.

The controller 110 of the stylus 100 detects whether or not a predetermined pen pressure value equal to or more than zero is applied to the core body 5 of the stylus 100, by monitoring the pen pressure value of the pen pressure detecting circuit 115 (step S121). When determining in this step S121 that a pen pressure equal to or more than zero is not detected, the controller 110 repeats this step S121.

When determining in step S121 that a pen pressure equal to or more than zero is detected, the controller 110 determines whether or not color information is received from the tablet type information terminal 200 (step S122). Incidentally, the tablet type information terminal 200 is configured to, when the stylus 100 indicates one of the color regions C1 to C*m* of the color palette 202 by a touch with a predetermined pen pressure, transmit the color information indicated by the touch to the stylus 100 through the RF unit 417.

When determining in this step S122 that color information is received from the tablet type information terminal 200, because the received color information is the color information of one of the color regions of the color palette 202 selected by the stylus 100, the controller 110 stores the received color information in the color information memory 114 (step S123). The controller 110 then makes the color light emitting units 85*a*, 85*b*, and 85*c* of the color light emitting unit group 85 emit light on the basis of the color information stored in the color information memory 114 (step S135 in FIG. 13).

In this case, in step S135, the controller 110 supplies the color information stored in the color information memory 114 to the color information generating circuit 112 and switches the correction table 113 to the third conversion table data, thereafter obtains the color information after conversion (after correction) from the color information generating circuit 112, and writes the obtained color information to the buffer memory of the color light emission control circuit 12. The color light emitting units 85*a*, 85*b*, and 85*c* of the color light emitting unit group 85 present the color of the color information stored in the color information memory 114 in a light emission color based on the corrected color information.

Incidentally, as described earlier, in this case, the color light emission control circuit 12 controls blinking time intervals of the color light emitting unit group 85 so as to enable visual recognition of the transmission of the color information from the tablet type information terminal 200 to the stylus 100. Visual feedback is thereby provided.

Next, the controller 110 determines whether or not the pen pressure equal to or more than zero has disappeared by monitoring the pen pressure value of the pen pressure detecting circuit 115 (step S136). When determining that the pen pressure has disappeared, the controller 110 stops the light emission for color presentation by the color light emitting unit group 85 (step S137). Then, after this step S137, the controller 110 returns the processing to step S121 in FIG. 12 to repeat the processing from step S121 on down.

When determining in step S122 that color information is not received from the tablet type information terminal 200, the controller 110 determines whether or not a color information pickup instruction is given by an operation of the side switch 4 (step S124). When determining in this step S124 that the color information pickup instruction is not given by an operation of the side switch 4, the controller 110 returns the processing to step S121 to repeat the processing from step S121 on down.

When determining in step S124 that the color information pickup instruction is given by an operation of the side switch 4, the controller 110 checks the level of the input signal of the image signal processing circuit 111 (output signal of the imager 83) to determine whether or not the amount of light received by the imager 83 is sufficient to pick up color information (step S125). When determining in this step S125 that the amount of light received by the imager 83 is not sufficient to pick up color information, the controller 110 illuminates a position touched by the stylus 100 by making the color light emitting unit group 85 emit white light by the color light emission control circuit 12, and thereby makes the amount of light received by the imager 83 sufficient to pick up color information (step S126).

Then, the controller 110 picks up color information at the position touched by the stylus 100 by extracting the color information from an image signal from the imager 83 in the image signal processing circuit 111 and obtaining the color information corrected by the correction table 113 in the color information generating circuit 112 (step S131 in FIG. 13). When determining in step S125 that the amount of light received by the imager 83 is sufficient to pick up the color information, the controller 110 proceeds to step S131 in FIG. 13 without performing the light emission in step S126, and picks up the color information at the position touched by the stylus 100.

After step S131, the controller 110 transmits, by radio, the picked-up color information to the tablet type information terminal 200 through the RF unit 21 (step S132). The color information transmitted in this case is color information obtained by correcting a color corresponding to the picked-up color information from the image signal processing circuit 111 in the color information generating circuit 112 on the basis of the second conversion table data of the correction table 113 so that faithful color reproduction is achieved on the display screen 200D of the display of the tablet type information terminal 200.

The controller 110 next determines whether or not a color information reception acknowledgment command is received from the tablet type information terminal 200 (step S133). When determining in this step S133 that the color information reception acknowledgment command is received from the tablet type information terminal 200, the controller 110 stores the color information picked up in step S131 in the color information memory 114 (step S134). The controller 110 then makes the color light emitting units 85*a*, 85*b*, and 85*c* of the color light emitting unit group 85 emit light on the basis of the color information stored in the color information memory 114 (step S135 in FIG. 13).

In this case, as described earlier, the color light emission control circuit 12 controls the blinking time intervals of the color light emitting unit group 85 to enable visual recognition of the transmission of the color information from the stylus 100 to the tablet type information terminal 200. Visual feedback is thereby provided.

In addition, when determining in step S133 that the color information reception acknowledgment command is not received from the tablet type information terminal 200, the controller 110 notifies the user that the radio transmission has failed by controlling the color light emission control circuit 12 so as to make the color light emitting unit group 85 make blinking display in a predetermined color, for example white (step S138).

Also in this case, tactile feedback is provided by activating the vibrator 25 for a predetermined time to indicate that there is a problem with the radio link with the tablet type information terminal 200.

Then, after step S135 or step S138, the controller 110 proceeds to step S136, where the controller 110 determines whether or not the pen pressure equal to or more than zero has disappeared by monitoring the pen pressure value of the pen pressure detecting circuit 115. When determining that the pen pressure has disappeared, the controller 110 stops the light emission by the color light emitting unit group 85 (step S137). Then, after this step S137, the controller 110 returns the processing to step S121 in FIG. 12 to repeat the processing from step S121 on down.

<Example of the Post-Pairing Processing Routine in the Tablet Type Information Terminal 200>

Figure 14:
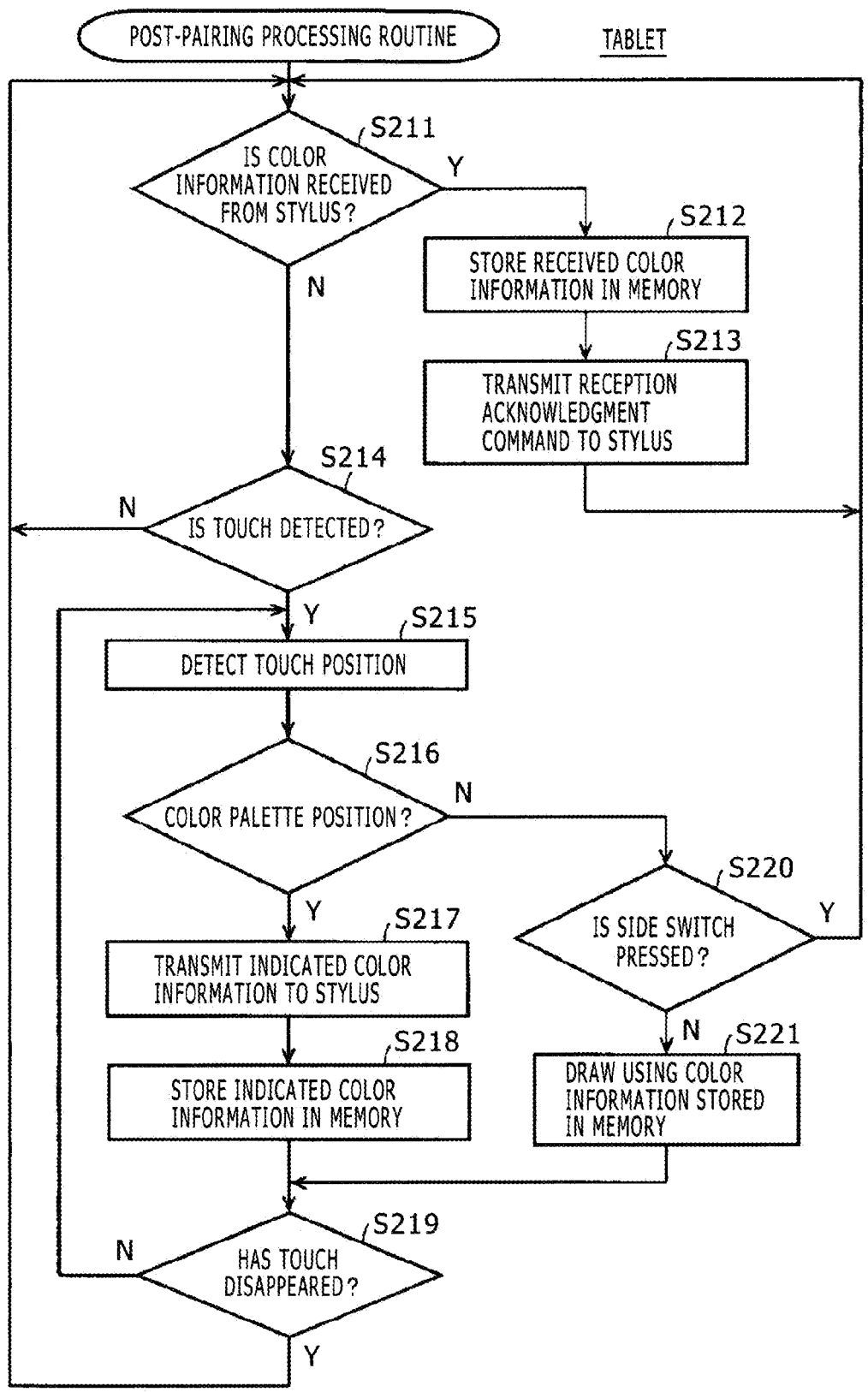
FIG. 14 is a diagram depicting a flowchart of assistance in explaining a flow of an example of processing operation in the position detecting device for use in conjunction with the first embodiment of the stylus according to the present disclosure.

A flowchart of FIG. 14 illustrates an example of the post-pairing processing routine in the tablet type information terminal 200. Incidentally, the flowchart of FIG. 14 illustrates a case where the control circuit 403 controls the finger touch/pen detecting circuit 402.

The control circuit 403 determines whether or not color information is received from the stylus 100 (step S211). Incidentally, as described earlier, when the stylus 100 has picked up color information, the stylus 100 transmits the picked-up color information to the tablet type information terminal 200 through the RF unit 21 on the basis of the signals of the radio link determining circuit and the pen pressure detecting circuit 115 or the side switch 4 constituting the trigger signal generating circuit.

When determining in step S211 that color information is received from the stylus 100, the control circuit 403 stores the received color information in the color information memory 4036 (step S212). The control circuit 403 then transmits a color information reception acknowledgment command to the stylus 100 (step S213). The control circuit 403 then returns the processing to step S211 to repeat the processing from step S211 on down.

When determining in step S211 that color information is not received from the stylus 100, the control circuit 403 determines whether or not a touch of the stylus 100 or a finger on the position detecting sensor with a pen pressure equal to or more than zero is detected (step S214). When no touch is detected, the control circuit 403 returns the processing to step S211 to repeat the processing from step S211 on down.

When determining in step S214 that a touch of the stylus 100 or a finger on the position detecting sensor is detected, the control circuit 403 detects the position of the touch (step S215), and determines whether or not the touch position is within a region of the color palette 202 on the display screen 200D (step S216).

When determining in this step S216 that the touch position is within a region of the color palette 202 on the display screen 200D, the control circuit 403 determines indicated color information on the basis of which of the color regions C1 to Cm of the color palette 202 includes the touch position, and transmits the determined indicated color information to the stylus 100 through the RF unit 417 by radio (step S217). The control circuit 403 then stores the determined indicated color information in the color information memory 4036 (step S218).

The control circuit 403 next determines whether or not the touch of the stylus 100 or the finger has disappeared on the position detecting sensor (step S219). When determining in this step S219 that the touch of the stylus 100 or the finger has not disappeared on the position detecting sensor, the control circuit 403 returns the processing to step S215 to repeat the processing from step S215 on down. When determining in step S219 that the touch of the stylus 100 or the finger has disappeared on the position detecting sensor, the control circuit 403 returns the processing to step S211 to repeat the processing from step S211 on down.

When determining in step S216 that the touch position is not within a region of the color palette 202 on the display screen 200D, the control circuit 403 determines whether or not the side switch 4 of the stylus 100 is in an operated state (step S220). When determining that the side switch is not in an operated state, the control circuit 403 draws a locus indicated by the finger or the stylus 100 on the position detecting sensor with the color information stored in the color information memory 4036 (step S221). The control circuit 403 thereafter advances the processing to step S219 to perform the processing from step S219 on down.

When determining in step S220 that the side switch 4 of the stylus 100 is in an operated state, the control circuit 403 returns the processing to step S211 to repeat the processing from step S211 on down.

As described above, according to the embodiment described above, the state of operation of the stylus 100 or the state of cooperative operation of the stylus 100 and the tablet type information terminal 200 can be easily recognized visually and identified on the basis of presentation by the color presenting circuit provided to the stylus 100. Moreover, the color presenting circuit is disposed in the pen tip portion of the stylus 100. The contents presented by the color presenting circuit can therefore be checked without the movement of a line of sight at a time of drawing operation. A user-friendly user interface can thus be provided.

Modifications of First Embodiment

In the above-described embodiment, the printed board 2 is provided, and the side switch 4 and the charging circuit for the battery 3 are formed on the printed board 2. However, the printed board 2 may be omitted by forming the side switch 4 and the charging circuit or the like on the surface 81b of the disk-shaped portion 81 of the optical processing module 8.

In addition, all of the electronic circuits may of course be formed on the printed board 2 without the electronic circuits being disposed on the surface 81b of the disk-shaped portion 81 of the optical processing module 8.

Second Embodiment

The foregoing first embodiment is the case where the stylus 100 and the position detecting device 201 are of the capacitive coupling type. It is needless to say, however, that the present disclosure is applicable also to a case where a stylus and a position detecting device are of an electromagnetic coupling type. A second embodiment is an example of a case where the present disclosure is applied to a stylus and a position detecting device of the electromagnetic coupling type.

Figure 15:
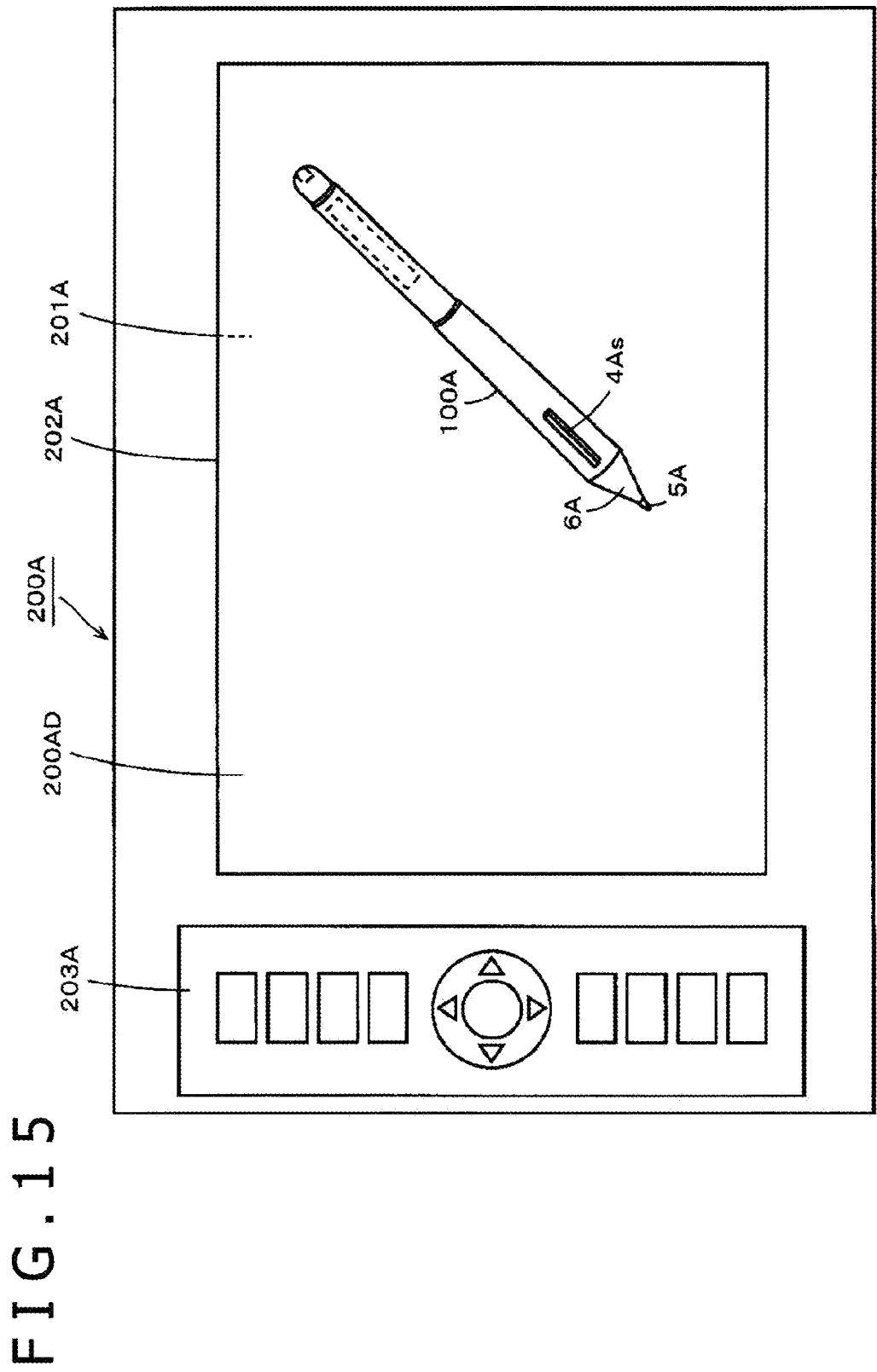
FIG. 15 is a diagram depicting a second embodiment of the stylus according to the present disclosure together with an electronic apparatus including a position detecting sensor.

FIG. 15 is a diagram depicting an example of external appearances of a tablet type information terminal 200A as an example of an electronic apparatus according to the second embodiment and a stylus 100A. A casing of the tablet type information terminal 200A in the present example has a thin plate-shaped external shape as a whole, and includes an upper case and a lower case (not depicted). FIG. 15 is a view depicting the upper case as viewed from above. An input region 202A for detecting an instruction input by the stylus 100A constituting an indicator and an operating switch section 203A are formed on the surface of the upper case. A plurality of operating elements for aiding in drawing by the stylus 100A are arranged in the operating switch section 203A as depicted in the figure. In the present example, these operating elements are not related to the present disclosure, and therefore description thereof will be omitted.

A display screen 200AD of a display device constituted of an LCD, for example, is disposed in the input region 202A of the tablet type information terminal 200A in the present example, and an electromagnetic coupling type position detecting device 201A is provided on the back side of the display screen 200AD.

Figure 16:
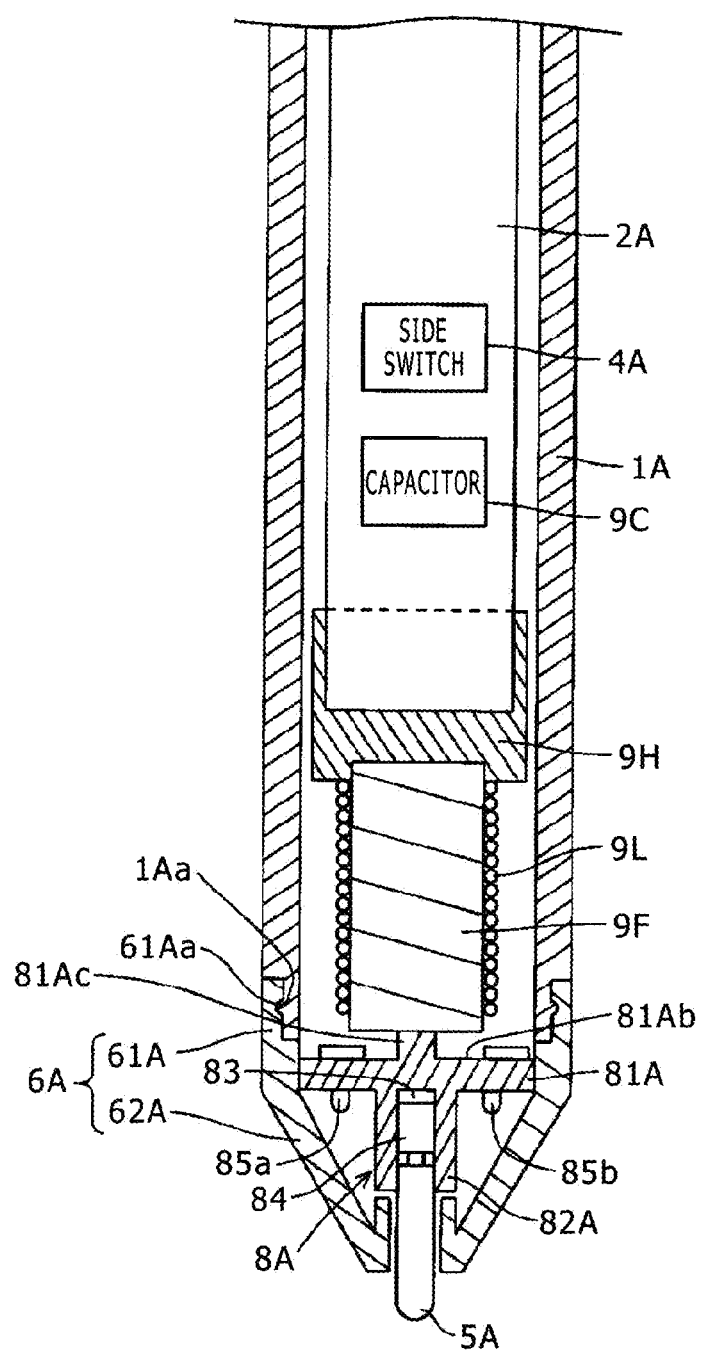
FIG. 16 is a diagram of assistance in explaining a constitution of an example of principal parts of the second embodiment of the stylus according to the present disclosure.

A configuration of principal parts of the electromagnetic coupling type stylus 100A in the present example is depicted in FIG. 16. As with the stylus 100 according to the first embodiment, the stylus 100A in the present example has a constitution in which a sleeve 6A is engaged with a housing (casing) 1A of a tubular shape on a side where a core body 5A is disposed. However, the housing 1A is not covered with a conductor. Incidentally, in the stylus 100A, constituent parts identical with those of the above-described stylus 100 are identified by the same reference symbols, and detailed description thereof will be omitted.

The sleeve 6A has a shape such that a tubular-shaped portion 61A and a circular truncated cone-shaped portion 62A are coupled to each other, and is formed of an optically transparent and light scattering material, for example an optically transparent and light scattering resin. The sleeve 6A is formed such that the tubular-shaped portion 61A of the sleeve 6A is engaged with the housing 1A of the stylus 100A. For this purpose, as depicted in FIG. 16, an annular engaging recessed portion 61Aa is formed in an inner circumferential surface of the tubular-shaped portion 61A of the sleeve 6A, and an annular engaging projecting portion 1Aa is formed on the housing 1A. However, the electrodes 91 and 92 formed in the sleeve 6 of the stylus 100 according to the first embodiment are not present on the inner circumferential surface of the sleeve 6A.

As depicted in FIG. 16, a printed board 2A is disposed within the housing 1A, and a coil 9L for electromagnetic coupling to the electromagnetic coupling type position detecting device 201A is provided in a state of being wound around a magnetic core, for example a ferrite core 9F. The printed board 2A is retained by a board holder 9H, and the ferrite core 9F wound with the coil 9L is also retained by the board holder 9H. A capacitor 9C forming a resonance circuit together with the coil 9L is disposed on the printed board 2A. Incidentally, the stylus 100A in the present example also has a side switch 4A. An operating section 4AS (see FIG. 15) for operating the side switch 4A is provided in a state of being exposed from the housing 1A.

An optical processing module 8A having a similar configuration to that of the stylus 100 according to the first embodiment is provided within a hollow portion of the sleeve 6A. The optical processing module 8A has a substantially similar configuration to that of the optical processing module 8. Therefore parts corresponding to those of the optical processing module 8 are identified with the addition of a suffix A. However, the optical processing module 8A is different from the optical processing module 8 in that the optical processing module 8A has an abutting portion 81Ac abutting against an end surface of the ferrite core 9F on a surface 81Ab of a disk-shaped portion 81A. The configuration of a color presenting circuit and a configuration for color information pickup in the optical processing module 8A are similar to those of the optical processing module 8, and therefore detailed description of the configurations will be omitted in the following.

[Example of Circuit Configuration of Stylus 100A and Position Detecting Device 201A]

Figure 17:
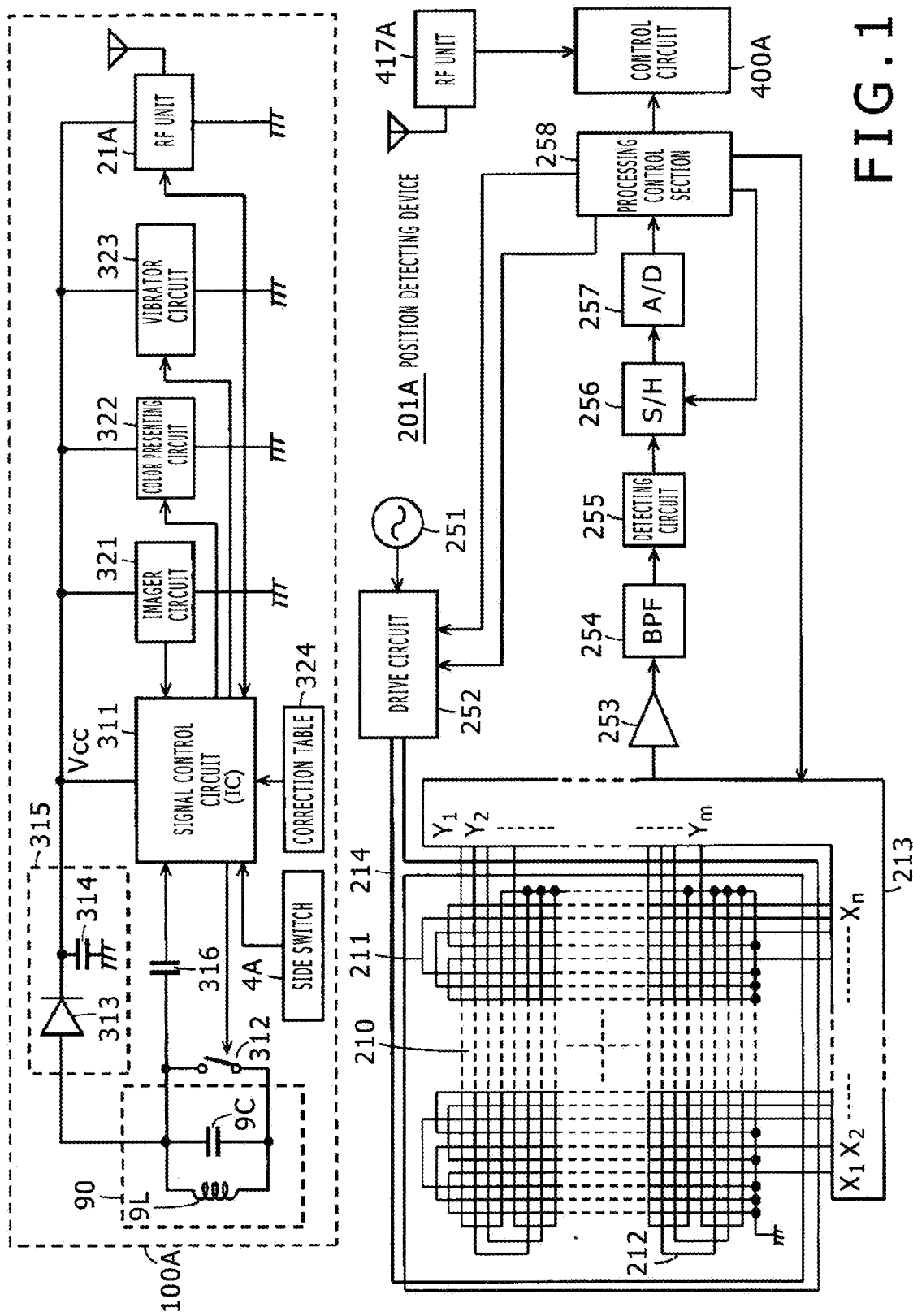
FIG. 17 is a diagram depicting a processing circuit of the second embodiment of the stylus according to the present disclosure together with an example of circuit configuration of a position detecting device.

FIG. 17 is a diagram depicting an example of a processing circuit of the stylus 100A and an example of a circuit configuration of the position detecting device 201A in the second embodiment.

The stylus 100A has a resonance circuit 90 constituted of the coil 9L and the capacitor 9C. In the second embodiment, electromagnetic coupling is established between the resonance circuit 90 of the stylus 100A and a position detecting sensor 210 of the position detecting device 201A. The position detecting device 201A detects an indicated position on the position detecting sensor 210 on the basis of the electromagnetic coupling to the stylus 100A. The stylus 100A forms a power supply voltage for the processing circuit of the stylus 100A from energy obtained by the electromagnetic coupling to the position detecting sensor 210, and thereby drives the processing circuit.

The stylus 100A in the second embodiment transmits a signal for position detection and information on a pen pressure value to the position detecting device 201A by controlling the signal transmission to the position detecting sensor 210 through the control of the resonance circuit 90.

The stylus 100A and the position detecting device 201A in the second embodiment do not determine whether a radio link through an RF radio channel formed by RF units is established, but determines whether a radio link is established on the basis of whether or not an electromagnetically coupled state is achieved, in which the stylus 100A and the position detecting device 201A can perform position detection and transmission of the information on the pen pressure value. That is, a radio link determining circuit of the stylus 100A in the second embodiment determines whether a radio link is established on the basis of detection of a signal from the position detecting device 201A via a radio channel formed by electromagnetic coupling to the position detecting device 201A. In addition, a radio link determining circuit of the position detecting device 201A determines whether the radio link is established on the basis of detection of a signal from the stylus 100A via the radio channel formed by electromagnetic coupling to the stylus 100A.

As depicted in FIG. 17, the position detecting device 201A includes the position detecting sensor 210 formed by laminating an X-axis direction loop coil group 211 and a Y-axis direction loop coil group 212. The position detecting device 201A is also provided with a selecting circuit 213 to which the X-axis direction loop coil group 211 and the Y-axis direction loop coil group 212 are connected. The selecting circuit 213 sequentially selects one loop coil of the two loop coil groups 211 and 212.

In the position detecting device 201A in the example of FIG. 17, an exciting coil 214 for supplying power to the stylus 100A is provided around the two loop coil groups 211 and 212.

The stylus 100A includes a signal control circuit 311 formed by an IC circuit. The coil 9L as an inductance element and the capacitor 9C disposed on the printed board 2A form the resonance circuit 90. A switch 312 is connected in parallel with the resonance circuit 90. The switch 312 is configured to be subjected to on-off control by the signal control circuit 311. A signal from the resonance circuit is subjected to ASK (Amplitude Shift Keying) modulation by the on-off control of the switch 312 by the signal control circuit 311, and supplied to the position detecting device 201A.

A power supply Vcc obtained by rectifying, in a rectifier circuit (power supply circuit) 315 constituted of a diode 313 and a high-capacitance capacitor 314, an alternating-current signal received by electromagnetic induction from the position detecting device 201A in the resonance circuit 90 formed by the coil 9L and the capacitor 9C, can drive the signal control circuit 311 for a predetermined time even when the alternating-current signal obtained by the electromagnetic induction has ceased to be received. Incidentally, it is needless to say that a dry cell battery or a rechargeable battery can be used as a power supply circuit in place of the rectifier circuit (power supply circuit) 315 constituted of the diode 313 and the high-capacitance capacitor 314.

The signal control circuit 311 is connected to the resonance circuit 90 via a capacitor 316, and monitors the operating conditions of the resonance circuit 90. By monitoring the operating conditions of the resonance circuit 90, it is possible to monitor conditions of electromagnetic coupling to the exciting coil 214 of the position detecting device 201A, or though not described in the present example, to detect, by the signal control circuit 311, a signal such as control data or the like transmitted from the position detecting device 201A by using the two loop coil groups 211 and 212, so that desired operation control can be performed.

Further, the signal control circuit 311 is connected with an imager circuit 321, a color presenting circuit 322, a vibrator circuit 323, a correction table 324, and an RF unit 21A, and is connected with the side switch 4A.

The imager circuit 321 includes the constituent parts of an imager 83A and the image signal processing circuit 111 and the pen pressure detecting circuit 115 depicted in FIG. 7. The part of the color information generating circuit 112 in FIG. 7 is included in the signal control circuit 311. The signal control circuit 311 also includes a memory corresponding to the color information memory 114.

The color presenting circuit 322 includes the constituent parts of the color light emission control circuit 12 and the color light emitting units 85a, 85b, and 85c constituting the color light emitting unit group 85 in FIG. 7. The vibrator circuit 323 includes the constituent parts of the vibrator driver 24 and the vibrator 25 in FIG. 7.

The RF unit 21A has a configuration similar to that of the RF unit 21 of the stylus 100 in the first embodiment. A radio channel is formed between the RF unit 21A and an RF unit 417A of the tablet type information terminal 200A to enable transmission and reception of commands and transmission and reception of color information between the stylus 100A and the tablet type information terminal 200A.

The signal control circuit 311 receives a pen pressure value from the pen pressure detecting circuit included in the imager circuit 321, and converts the pen pressure value into a digital signal of a plurality of bits, for example 8 bits. The signal control circuit 311 then controls the switch 312 by the digital signal corresponding to the pen pressure value.

Incidentally, in the example of FIG. 17, description will be made supposing that the loop coil groups 211 and 212 of the position detecting device 201A are used only to receive an electromagnetic coupling signal from the resonance circuit 90 of the stylus 100A. However, the loop coil groups 211 and 212 of the position detecting device 201A are not excluded from being used to generate a voltage for driving the signal control circuit 311 and the like included in the stylus 100A by electromagnetic coupling to the stylus 100A in place of the exciting coil 214. In addition, the transmission of a signal such as predetermined control data or the like from the position detecting device 201A to the signal control circuit 311 included in the stylus 100A is not excluded.

In the position detecting device 201A in the example of FIG. 17, the exciting coil 214 is connected to a drive circuit 252. The drive circuit 252 is connected to an oscillating circuit 251 that oscillates at a predetermined frequency fo.

The drive circuit 252 is controlled by a processing control section 258 formed by a microcomputer. The processing control section 258 controls signal transmission from the exciting coil 214 to the stylus 100A by controlling the supply of an oscillating signal having the frequency fo from the oscillating circuit 251 to the exciting coil 214 through the control of the drive circuit 252.

The selecting circuit 213 is subjected to selection control by the processing control section 258 to select one loop coil. An induced voltage generated in the loop coil selected by the selecting circuit 213 is amplified by a receiving amplifier 253, and then supplied to a band-pass filter 254, so that only a component of the frequency fo is extracted. The band-pass filter 254 supplies the extracted component to a detecting circuit 255.

The detecting circuit 255 detects the component of the frequency fo, and supplies a direct-current signal corresponding to the detected component of the frequency fo to a sample and hold circuit 256. The direct-current signal is further sent to an A/D converter circuit 257. The A/D converter circuit 257 converts the analog output of the sample and hold circuit 256 into a digital signal, and outputs the digital signal to the processing control section 258.

Then, the processing control section 258 determines whether or not the digital signal from the A/D converter circuit 257 is a value exceeding a predetermined threshold value, and thereby determines whether or not the loop coil selected by the selecting circuit 213 is a loop coil at a position indicated by the stylus 100A.

The processing control section 258 also detects a pen pressure by detecting interruption of the signal from the stylus 100A as a digital signal of a few bits, for example eight bits, separately from the detection of the position indicated by the stylus 100A. A control circuit 400A is connected to the processing control section 258 and the RF unit 417A, and controls the position detecting device 201A.

As in the first embodiment, the stylus 100A performs color information selection setting, pickup setting, and color presentation processing. In addition, as in the first embodiment, the tablet type information terminal 200A cooperates with the stylus 100A so as to perform color information setting and transmission processing. However, as described earlier, in the second embodiment, whether a radio link between the stylus 100A and the tablet type information terminal 200A is established is determined on the basis of a radio link based on electromagnetic coupling between the resonance circuit 90 of the stylus 100A and the position detecting sensor 210 rather than a radio link between the RF unit 21A and the RF unit 417A.

[Example of Processing Operation of Stylus 100A]

Figure 18:
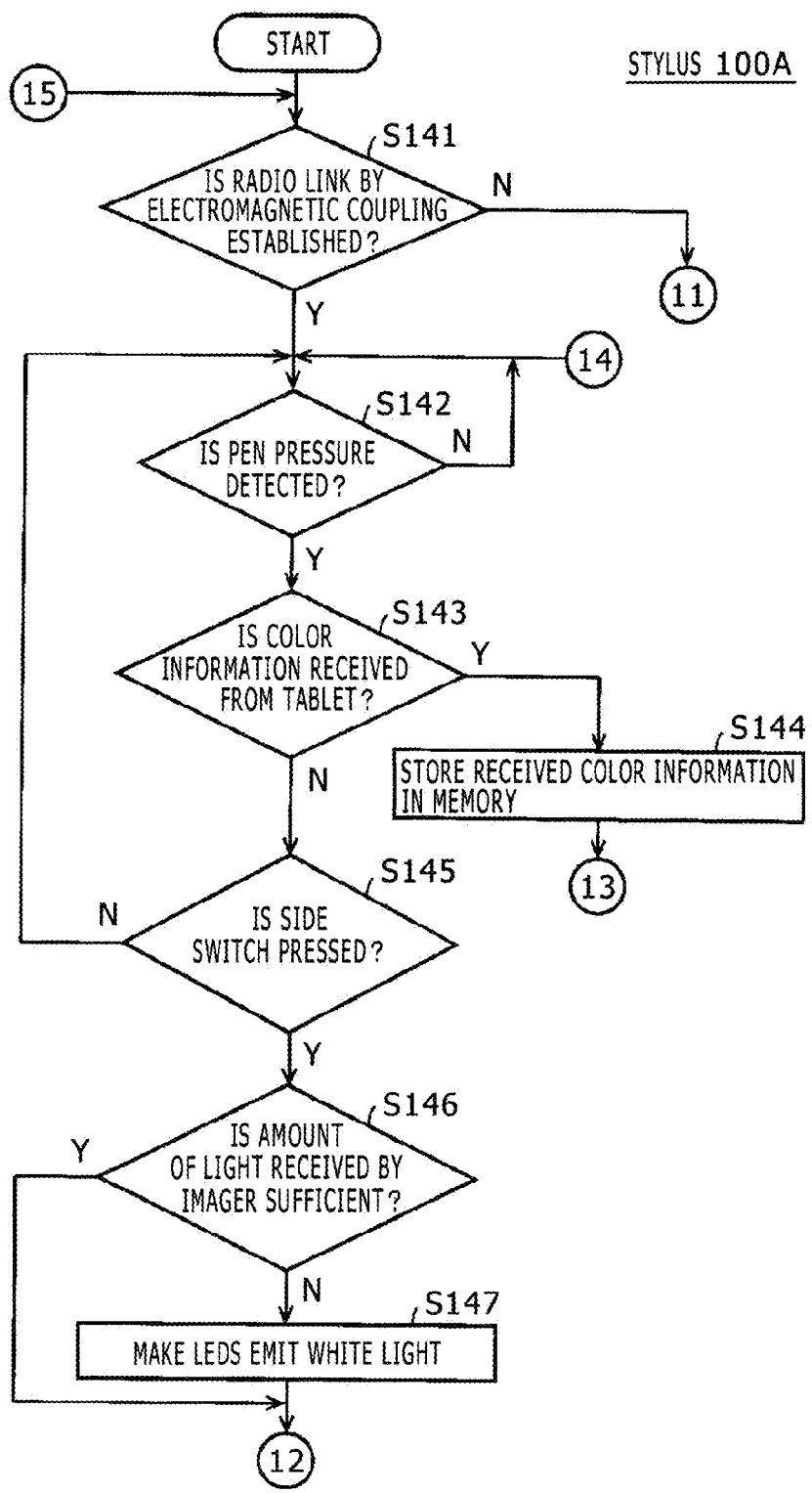
FIG. 18 is a diagram depicting a part of a flowchart of assistance in explaining a flow of processing operation of the second embodiment of the stylus according to the present disclosure.
Figure 19:
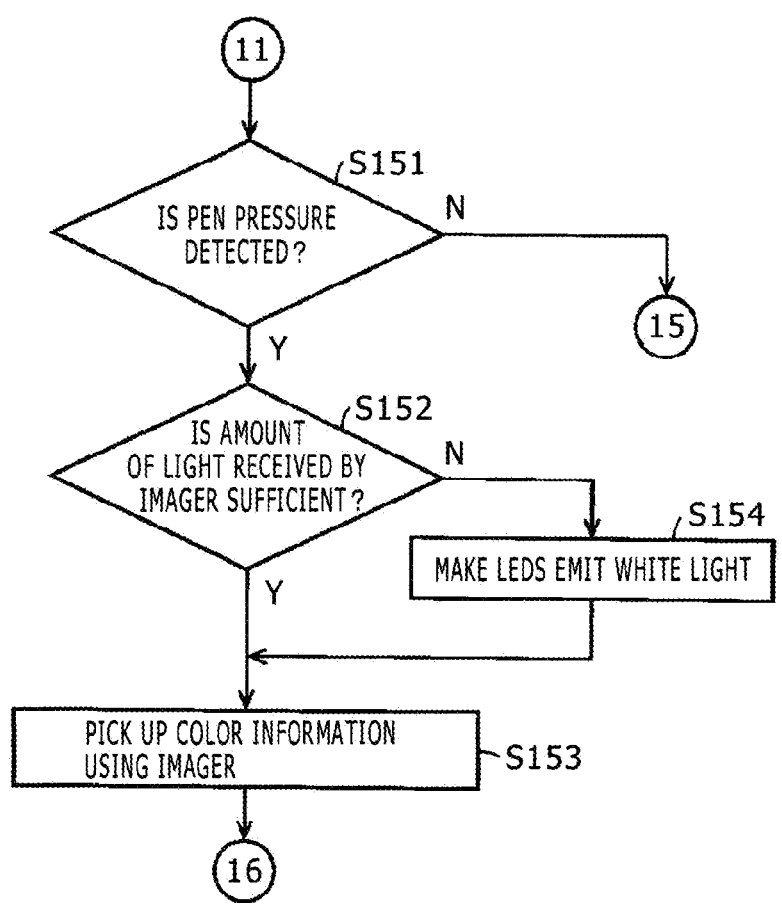
FIG. 19 is a diagram depicting a part of the flowchart of assistance in explaining the flow of the processing operation of the second embodiment of the stylus according to the present disclosure.
Figure 20:
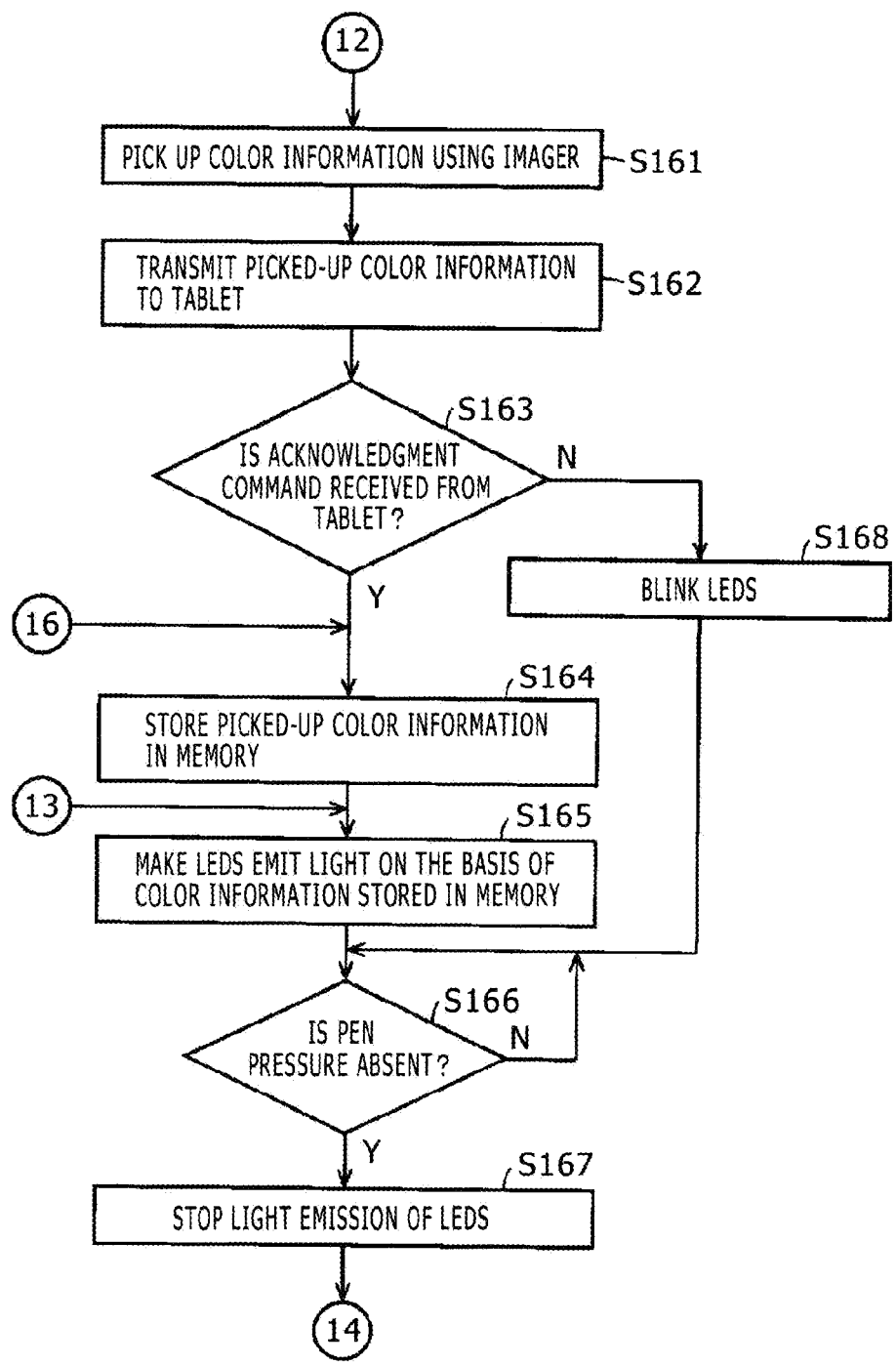
FIG. 20 is a diagram depicting a part of the flowchart of assistance in explaining the flow of the processing operation of the second embodiment of the stylus according to the present disclosure.

A flowchart depicted in FIG. 18, FIG. 19, and FIG. 20 illustrates an example of a processing routine related to color information pickup and color presentation in the stylus 100A.

The stylus 100A (signal control circuit 311) determines whether or not a radio link based on electromagnetic coupling to the position detecting device 201A is established (step S141). When determining in this step S141 that the radio link based on the electromagnetic coupling is not established, the stylus 100A monitors the pen pressure value detected by the pen pressure detecting circuit of the imager circuit 321, and detects whether or not a predetermined pen pressure value equal to or more than zero is applied to the core body 5A of the stylus 100A (step S151 in FIG. 19). When determining in this step S151 that a pen pressure equal to or more than zero is not detected, the stylus 100A returns the processing to step S141 in FIG. 18 to repeat the processing from step S141 on down.

When determining in step S151 that a pen pressure equal to or more than zero is detected, the stylus 100A checks the level of an input signal of the image signal processing circuit of the imager circuit 321 (output signal of the imager 83A)

to determine whether or not an amount of light received by the imager 83 is sufficient to pick up color information (step S152). When determining in this step S152 that the amount of light received by the imager 83A is not sufficient to pick up color information, the stylus 100A illuminates a position touched by the stylus 100 by making the color light emitting units 85a, 85b, and 85c emit white light by the color presenting circuit 322, and thereby makes the amount of light received by the imager 83 sufficient to pick up color information (step S154).

Then, the stylus 100A picks up color information at the position touched by the stylus 100A by extracting the color information from an image signal from the imager 83 in the image signal processing circuit of the imager circuit 321 and obtaining color information resulting from correction of the extracted color information by the correction table 113 (step S153). When determining in step S152 that the amount of light received by the imager 83 is sufficient to pick up color information, the stylus 100A proceeds to step S153 without performing the light emission in step S154, and picks up the color information at the position touched by the stylus 100.

Then, the stylus 100A stores the picked-up color information in the color information memory (step S164). Then, the stylus 100A makes the color light emitting units 85a, 85b, and 85c emit light on the basis of the color information stored in the color information memory (step S165).

In this case, in step S165, the stylus 100A corrects the color information stored in the color information memory using the third conversion table data of the correction table 324, and writes the corrected color information to a buffer memory of the color presenting circuit 322. The color light emitting units 85a, 85b, and 85c thus present the color of the color information stored in the color information memory in a light emission color based on the corrected color information.

In addition, as described earlier, blinking time intervals of the color light emitting unit group 85 are controlled so as to enable visual recognition of the transmission of the color information from the stylus 100A to the tablet type information terminal 200A. Visual feedback is thus provided.

Next, the stylus 100A determines whether or not the pen pressure equal to or more than zero has disappeared by monitoring the pen pressure value of the pen pressure detecting circuit of the imager circuit 321 (step S166). When determining that the pen pressure has disappeared, the stylus 100A stops the light emission for color presentation by the color light emitting units 85a, 85b, and 85c (step S167). Then, after this step S167, the stylus 100A returns the processing to step S142 in FIG. 18 to repeat the processing from step S142 on down.

When determining in step S141 that the radio link based on the electromagnetic coupling is established, the stylus 100A monitors the pen pressure value detected by the pen pressure detecting circuit of the imager circuit 321 to detect whether or not a predetermined pen pressure value equal to or more than zero is applied to the core body 5A of the stylus 100A (step S142). When determining in this step S142 that a pen pressure equal to or more than zero is not detected, the stylus 100A repeats this step S142.

When determining in step S142 that a pen pressure equal to or more than zero is detected, the stylus 100A determines whether or not color information is received from the tablet type information terminal 200A (step S143). When the stylus 100A indicates one of color regions of a color palette displayed on the display screen 200AD by a touch with a predetermined pen pressure, the tablet type information terminal 200A transmits the color information indicated by the touch to the stylus 100A through the RF unit 417A.

When determining in this step S143 that color information is received from the tablet type information terminal 200A, the received color information is the color information of one of the color regions of the color palette selected by the stylus 100A, and therefore the stylus 100A stores the received color information in the color information memory (step S144). The stylus 100A then makes the color light emitting units 85a, 85b, and 85c emit light on the basis of the color information stored in the color information memory (step S165 in FIG. 20).

In this case, in step S165, the stylus 100A corrects the color information stored in the color information memory using the third conversion table data of the correction table 324, and writes the corrected color information to the buffer memory of the color presenting circuit 322. The color light emitting units 85a, 85b, and 85c thus present the color of the color information stored in the color information memory in a light emission color based on the corrected color information.

In addition, as described earlier, the blinking time intervals of the color light emitting unit group 85 are controlled so as to enable visual recognition of the transmission of the color information from the tablet type information terminal 200A to the stylus 100A. Visual feedback is thus provided.

Next, the stylus 100A determines whether or not the pen pressure equal to or more than zero has disappeared by monitoring the pen pressure value of the pen pressure detecting circuit of the imager circuit 321 (step S166). When determining that the pen pressure has disappeared, the stylus 100A stops the light emission for color presentation by the color light emitting units 85a, 85b, and 85c (step S167). Then, after this step S167, the stylus 100A returns the processing to step S142 in FIG. 18 to repeat the processing from step S142 on down.

When determining in step S143 that color information is not received from the tablet type information terminal 200A, the stylus 100A determines whether or not a color information pickup instruction is given by an operation of the side switch 4A (step S145). When determining in this step S145 that the color information pickup instruction is not given by an operation of the side switch 4A, the stylus 100A returns the processing to step S142 to repeat the processing from step S142 on down.

When determining in step S145 that the color information pickup instruction is given by an operation of the side switch 4A, the stylus 100A checks the level of the input signal of the image signal processing circuit of the imager circuit 321 (output signal of the imager 83) to determine whether or not the amount of light received by the imager 83 is sufficient to pick up color information (step S146). When determining in this step S146 that the amount of light received by the imager 83 is not sufficient to pick up color information, the stylus 100A illuminates a position touched by the stylus 100 by making the color light emitting units 85a, 85b, and 85c emit white light by the color presenting circuit 322, and thereby makes the amount of light received by the imager 83 sufficient to pick up color information (step S147).

Then, the stylus 100A picks up color information at the position touched by the stylus 100A by extracting the color information from an image signal from the imager 83 in the image signal processing circuit of the imager circuit 321 and obtaining color information resulting from correction of the extracted color information by the correction table 113 (step S161 in FIG. 20). When determining in step S146 that the amount of light received by the imager 83 is sufficient to pick up color information, the stylus 100A proceeds to step S161 in FIG. 20 without performing the light emission in step S147, and picks up the color information at the position touched by the stylus 100A.

After step S161, the stylus 100A transmits the picked-up color information to the tablet type information terminal 200A by radio through the RF unit 21A (step S162). In this case, color correction between the color information picked up by the imager circuit 321 and color information displayed on the display screen 200AD of the display of the tablet type information terminal 200A is made on the basis of second conversion table data of the correction table 113. Thus, a color corresponding to the color information picked up by the imager circuit 321 is faithfully displayed on the display screen 200AD of the display of the tablet type information terminal 200A.

The stylus 100A next determines whether or not a color information reception acknowledgment command is received from the tablet type information terminal 200A (step S163). When determining in this step S163 that the color information reception acknowledgment command is received from the tablet type information terminal 200A, the color information picked up in step S161 is stored in the color information memory (step S164). The stylus 100A then makes the color light emitting units 85a, 85b, and 85c emit light on the basis of the color information stored in the color information memory (step S165).

In addition, as described earlier, the blinking time intervals of the color light emitting unit group 85 are controlled so as to enable visual recognition of the transmission of the color information from the stylus 100A to the tablet type information terminal 200A. Visual feedback is thus provided.

When determining in step S163 that the color information reception acknowledgment command is not received from the tablet type information terminal 200A, the stylus 100A indicates to the user that the radio transmission has failed by controlling the color light emitting units 85a, 85b, and 85c by the color presenting circuit 322 so as to make the color light emitting units 85a, 85b, and 85c make blinking display in white (step S168).

Also in this case, tactile feedback is provided by activating the vibrator 25 for a predetermined time to indicate that there is a problem with the radio link with the tablet type information terminal 200A.

Then, after step S165 or step S168, the stylus 100A proceeds to step S166 to determine whether or not the pen pressure equal to or more than zero has disappeared by monitoring the pen pressure value detected in the pen pressure detecting circuit of the imager circuit 321. When determining that the pen pressure has disappeared, the stylus 100A stops the light emission for color presentation by the color light emitting units 85a, 85b, and 85c (step S167). After this step S167, the stylus 100A returns the processing to step S142 in FIG. 18 to repeat the processing from step S142 on down.

Processing on the side of the tablet type information terminal 200A is similar to the processing depicted in FIG. 11 and FIG. 14, and therefore description thereof will be omitted here.

As described above, also in the case of the electromagnetic coupling type stylus 100A and the tablet type information terminal 200A, as in the first embodiment, the state of operation of the stylus 100A or the state of cooperative operation of the stylus 100A and the tablet type information terminal 200A can be easily recognized visually and identified on the basis of presentation by the color presenting circuit provided to the stylus 100A. Moreover, the color presenting circuit is disposed in the pen tip portion of the stylus 100A. The contents presented by the color presenting circuit can therefore be checked without the movement of a line of sight at a time of drawing operation. A user-friendly user interface can thus be provided.

Modifications of Second Embodiment

In the stylus 100A according to the foregoing second embodiment, the coil 9L forming the resonance circuit 90 and the ferrite core 9F as a magnetic core wound with the coil 9L are provided in the hollow portion of the housing 1A as parts separate from the optical processing module 8A. However, the coil 9L forming the resonance circuit 90 can also be provided integrally with the optical processing module 8A by devising the configuration of the optical processing module 8A.

Figure 21:
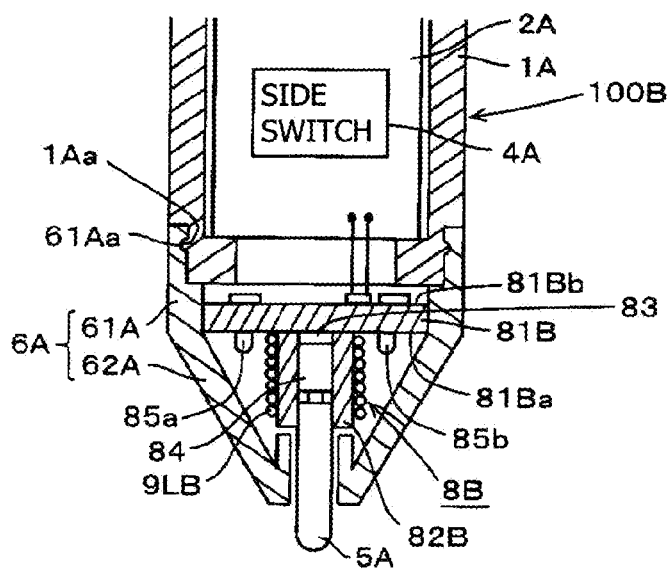
FIG. 21 is a diagram of assistance in explaining a constitution of an example of principal parts of a third embodiment of the stylus according to the present disclosure.
Figure 22:
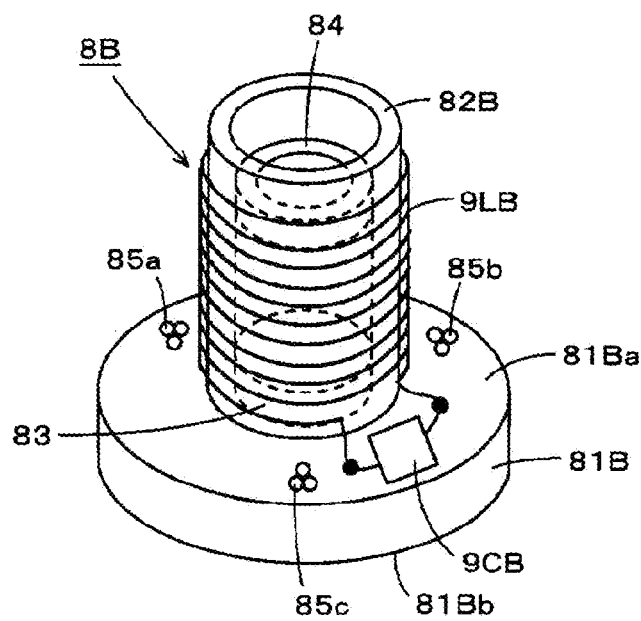
FIG. 22 is a diagram of assistance in explaining a constitution of an example of a part of the principal parts of the third embodiment of the stylus according to the present disclosure.

FIG. 21 is a sectional view of assistance in explaining a configuration on the pen point side of a thus configured stylus 100B. FIG. 22 is a perspective view of assistance in explaining an example of configuration of an optical processing module 8B used in the stylus 100B. Also in the stylus 100B in the present example, the same parts as in the stylus 100 described above are identified by the same reference symbols, and detailed description thereof will be omitted.

In the stylus 100B in the present example, the optical processing module 8B includes a disk-shaped portion 81B and a tubular body portion 82B. However, the optical processing module 8B has a configuration formed by integrating the disk-shaped portion 81B and the tubular body portion 82B formed of respective different materials. The disk-shaped portion 81B is formed by a resin that can play the role of a printed board as in the foregoing example. The tubular body portion 82B is formed of such a material as is able to constitute a magnetic core. For example, the tubular body portion 82B in the present example is formed of a material in which a magnetic powder is mixed with a resin to provide a predetermined magnetic property.

An imager 83 and an optical system mechanism section 84 are provided within the hollow portion of the tubular body portion 82B, as in the stylus 100. In the present example, a coil 9LB is wound around the outer circumferential surface of the tubular body portion 82B having a magnetic property. As depicted in FIG. 22, a resonance circuit is formed by connecting one end and another end of the coil 9LB respectively to each end of a capacitor 9CB provided on a surface 81Ba on the tubular body portion 82B side of the disk-shaped portion 81B. The capacitor 9CB may be provided on a surface 81Bb on an opposite side of the disk-shaped portion 81B from the tubular body portion 82B side, and may be electrically connected to the one end and the other end of the coil 9LB via through holes formed in the disk-shaped portion 81B. Further, the capacitor 9CB may of course be disposed on a printed board 2A on which a side switch 4A is provided.

According to the stylus 100B in the present example, the signal processing circuit of the stylus 100B, which includes the resonance circuit constituted of the coil 9LB and the capacitor 9CB for electromagnetic coupling to the position detecting device 201A, can be provided to the optical processing module 8B provided within the hollow portion of the sleeve 6A.

Third Embodiment

In the case of the capacitive coupling type stylus 100 according to the first embodiment, the stylus 100 has an oscillating circuit to generate a transmission signal and transmit the transmission signal to the position detecting device 201. However, instead of the type that generates a transmission signal with the stylus itself having an oscillating circuit as in this example, a capacitive coupling type stylus may be of a type that receives a signal from a position detecting sensor of a position detecting device by electric field coupling, enhances the received signal, and transmits the signal so as to feed back the signal to the position detecting sensor, as disclosed in Japanese Patent Laid-Open No. 2012-221304, for example.

Figure 23:
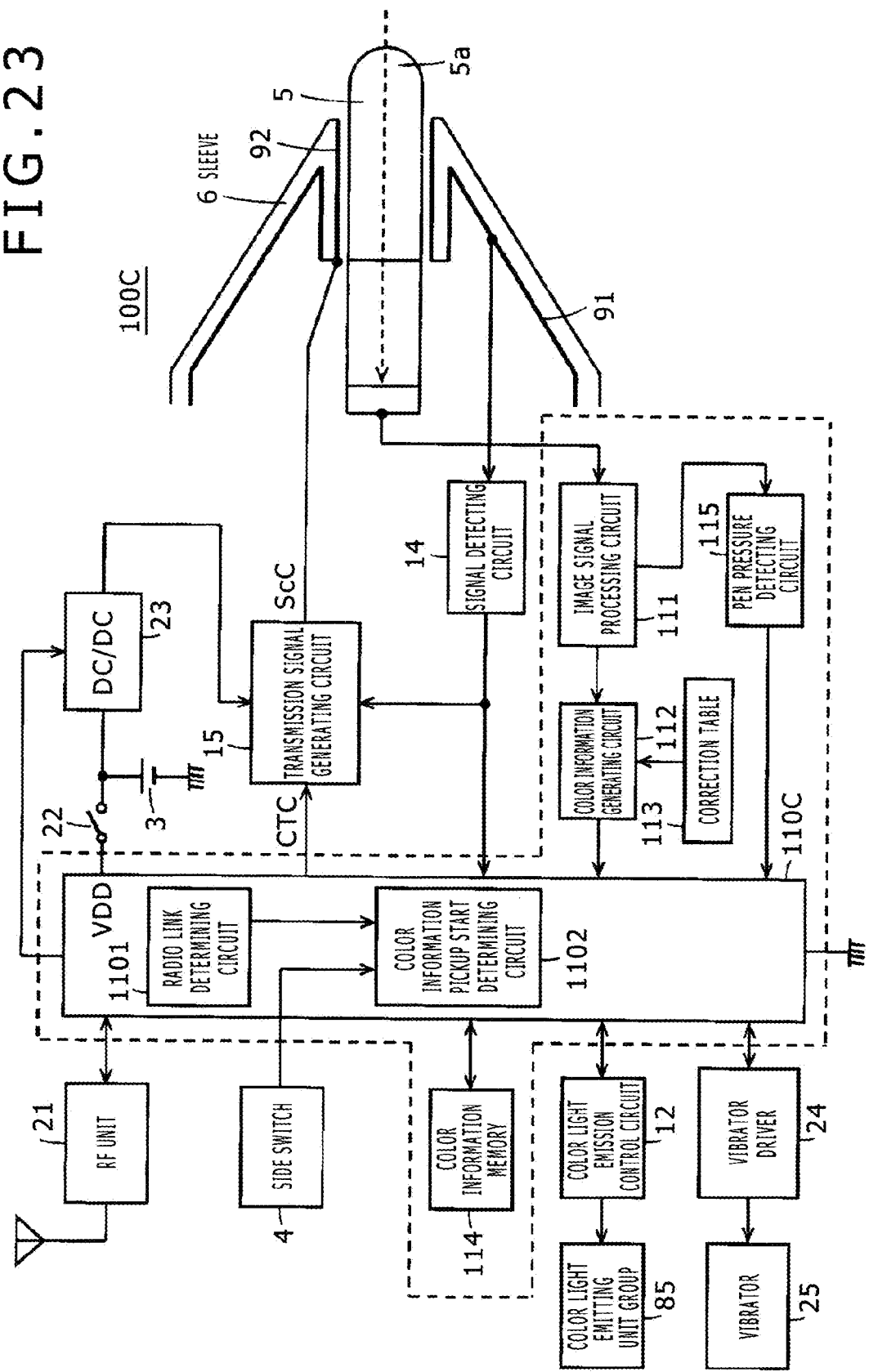
FIG. 23 is a block diagram depicting an example of configuration of a signal processing circuit of a fourth embodiment of the stylus according to the present disclosure.

The present disclosure is applicable also to a capacitive coupling type stylus of such a type. FIG. 23 depicts an example of configuration of a processing circuit of a capacitive coupling type stylus 100C of this type (stylus 100C according to a third embodiment). In the description of the stylus 100C according to the third embodiment, the same parts as in the stylus 100 according to the foregoing first embodiment are identified by the same reference symbols, and detailed description thereof will be omitted.

The stylus 100C in the present example has a similar mechanical configuration to that of the stylus 100, and is different only in electric configuration from the stylus 100. FIG. 23 is a diagram depicting an example of an electric configuration of the stylus 100C according to the third embodiment, and corresponds to the example of the electric configuration of the stylus 100 according to the first embodiment depicted in FIG. 7. In FIG. 23, the same parts as in the example of the electric configuration in FIG. 7 are identified by the same reference symbols, and detailed description thereof will be omitted.

The stylus 100C according to the third embodiment receives a signal for position detection, which is transmitted from a position detecting sensor, by an electrode 91 on the inner wall surface of a sleeve 6 by capacitive coupling (electric field coupling). Then, in the stylus 100C, as depicted in FIG. 23, a signal detecting circuit 14 connected to the electrode 91 detects the signal from the position detecting sensor by capacitive coupling (electric field coupling).

The signal detecting circuit 14 supplies the detected signal from the position detecting sensor to a transmission signal generating circuit 15, and supplies the detected signal from the position detecting sensor to a controller 110C. On the basis of a control signal CTC from the controller 110C, the transmission signal generating circuit 15 enhances the signal from the signal detecting circuit 14, and supplies an output signal ScC to an electrode 92 formed on the inner wall surface of a through hole part into which a core body 5 of the sleeve 6 is inserted. Hence, the stylus 100C feeds back the signal obtained from the position detecting sensor through the electrode 91 from the electrode 92 to the position detecting sensor.

The position detecting sensor receives the feedback signal from the stylus 100C in a signal receiving period after the transmission of the signal. At this time, a position of the stylus 100C on the position detecting sensor is detected by determining from which X-conductor of an X-conductor group 301 and which Y-conductor of a Y-conductor group 302 the feedback signal is obtained.

A radio link determining circuit 1101 of the stylus 100C in the example of FIG. 23 does not detect whether or not a radio link is established by using an RF radio channel to a position detecting device through an RF unit 21, but determine whether or not a radio link is established on the basis of whether or not a signal from the position detecting sensor is detected on a radio channel through a capacitive coupling formed between the stylus 100C and the position detecting sensor of the position detecting device. That is, the radio link determining circuit 1101 of the controller 110C determines, on the basis of the signal detected in the signal detecting circuit 14, whether or not a radio link based on capacitive coupling (electric field coupling) between the electrodes 91 and 92 and the position detecting sensor is established. The position detecting device similarly determines whether or not the radio link is established on the basis of whether or not a signal from the stylus 100C is detected via the capacitive coupling formed between the stylus 100C and the position detecting sensor.

Incidentally, it is needless to say that also in the third embodiment, as in the first embodiment, whether or not the radio link is established between the stylus 100C and the position detecting device may be determined by detecting whether or not a radio link is established by using an RF radio channel between the stylus 100C and the position detecting device through the RF unit 21 and an RF unit 417.

Incidentally, in the example of FIG. 23, the signal from the position detecting sensor is received by the electrode 91, and the enhanced signal is fed back to the position detecting sensor through the electrode 92. However, it is also possible to receive the signal from the position detecting sensor by the electrode 92, and feedback the enhanced signal to the position detecting sensor through the electrode 91.

As for the other processing of color information pickup, transmission and reception of color information through the RF unit 21, and the like, the stylus 100C has a configuration similar to that of the stylus 100 according to the first embodiment, and performs processing operation similar to that of the stylus 100 according to the first embodiment.

[Other Modifications of Stylus according to First Embodiment]

The stylus 100 according to the foregoing first embodiment transmits the transmission signal from the transmission signal generating circuit 13 constituted of an oscillating circuit from the electrode 91 formed in the sleeve 6. However, the transmission signal can also be transmitted from an electrode formed on the core body by devising the constitution of the core body.

Figure 24A:
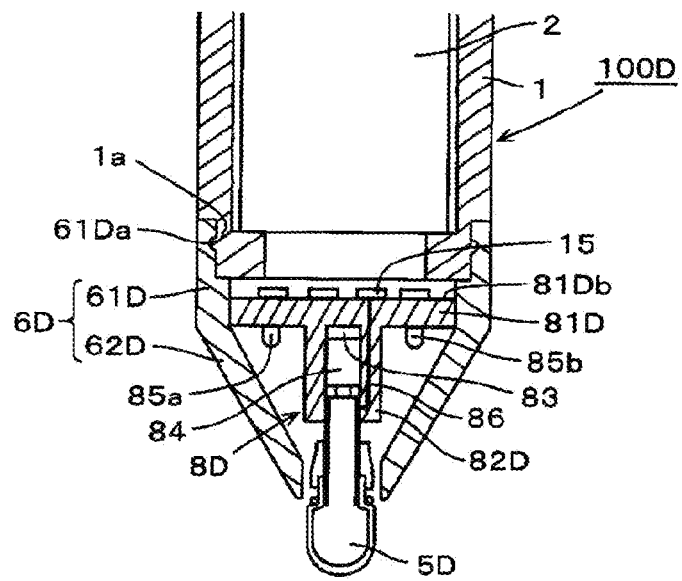
FIGS. 24A and 24B illustrate a constitution of an example of principal parts of yet another embodiment of the stylus according to the present disclosure.
Figure 24B:
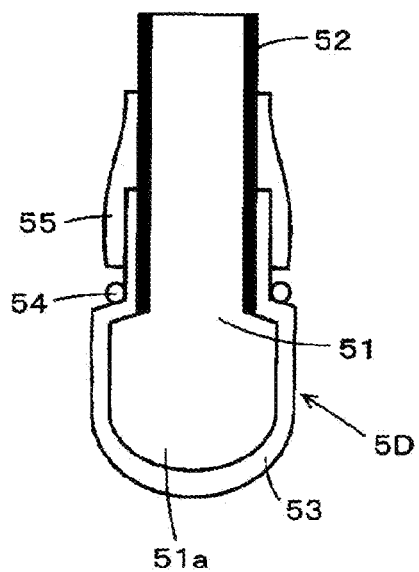

FIG. 24A is a diagram depicting an example of configuration on the pen point side of a thus configured stylus 100D according to a fourth embodiment. FIG. 24B is a diagram of assistance in explaining an example of configuration of a core body 5D used by the stylus 100D according to the fourth embodiment. The same parts as in the stylus 100 according to the first embodiment are identified by the same reference symbols, and detailed description thereof will be omitted.

In the present example, as in the core body 5, a core body main body portion 51 of the core body 5D is formed by an optically transparent member, for example an optically transparent resin. A conductor layer 52 is formed on the side circumferential surface of the core body main body portion 51 of the core body 5D except for an end portion 51a. In the present example, the conductor layer 52 is formed at least on a part that is on an opposite side from the end portion 51a of the core body main body portion 51 and that is inserted into a fitting hole of a tubular body portion 82D of an optical processing module 8D.

As depicted in FIG. 24A, a conductor 86 is formed in the tubular body portion 82D of the optical processing module 8D by insert molding, for example, so as to extend to the inner wall surface of the fitting hole into which the opposite side of the core body main body portion 51 from the end portion 51a is inserted. The conductor 86 in the present example is connected to a transmission signal generating circuit 15 provided on a surface 81Db side through a through hole provided in a disk-shaped portion 81D of the optical processing module 8D.

In the present embodiment, as depicted in FIG. 24B, the end portion 51a of the core body main body portion 51 is covered by a cloth 53 having a light transmitting property and having conductivity. The cloth 53 is locked by a ring-shaped packing member 54 at the base of the end portion 51a. Further, the remaining part of the cloth 53 is covered by a heat-shrinkable cover member 55 so as to be pressed against the core body main body portion 51 in a state of being in contact with the conductor layer 52.

The opposite side of the core body main body portion 51 of the thus configured core body 5D from the end portion 51a is inserted into the fitting hole of the tubular body portion 82D of the optical processing module 8D. As a result, the conductor layer 52 and the cloth 53 of the core body 5D are electrically connected to the transmission signal generating circuit 15 through the conductor 86 in the tubular body portion 82D of the optical processing module 8D. That is, a transmission signal is supplied to a position detecting sensor through the conductor layer 52 and the cloth 53 of the core body 5D.

DESCRIPTION OF REFERENCE SYMBOLS

100 Stylus
200 Tablet type information terminal as an example of electronic apparatus
4 Side switch
5 Core body
8 Optical processing module
12 Color light emission control circuit
13 Transmission signal generating circuit
83 Imager
84 Optical system mechanism section
85a, 85b, 85c Color light emission unit
91 Electrode
92 Electrode
112 Color information generating circuit
113 Correction table
114 Color information memory
115 Pen pressure detecting circuit
1101 Radio link determining circuit
1102 Color information pickup start determining circuit

The invention claimed is:

1. A stylus, comprising:
an elongated housing having a tip end and a tail end along an axial direction;
an optical sensor configured to receive incoming light incident on the tip end;
a memory configured to store color information of the incoming light captured by the optical sensor;
a light emitter provided adjacent to the tip end and configured to emit color light corresponding to the color information stored in the memory;
a light blocker interposed between the optical sensor and the light emitter, the light blocker having a first surface facing the light emitter, and the first surface being mirror-finished to reflect the color light emitted from the light emitter;
a transmitter configured to transmit, from the tip end, a position signal; and
a control circuit configured to control the optical sensor, the light emitter, and the transmitter.

2. The stylus of claim 1, wherein the light blocker is configured as a divider between a first region, in which an optical system configured to guide the incoming light from the tip end to the optical sensor is arranged, and a second region, in which the light emitter is arranged.

3. The stylus of claim 2, wherein the optical system includes one or more lenses.

4. The stylus of claim 2, wherein the light blocker is a tubular body.

5. The stylus of claim 4, wherein the optical system includes an optically-transparent rod-shaped piece, which is inserted in the tubular body and used to guide the incoming light from the tip end to the optical sensor.

6. The stylus of claim 4, wherein an axis of the tubular body intersects a plate, and the light emitter is provided on a surface of the plate.

7. The stylus of claim 6, wherein the light emitter includes light emitting diodes (LEDs) concentrically arranged on the surface of the plate to radially surround the tubular body.

8. The stylus of claim 6, further comprising an optically-transparent or light-scattering sleeve provided adjacent to the tip end of the elongated housing to cover the light emitter.

9. The stylus of claim 6, further comprising a sleeve provided adjacent to the tip end of the elongated housing to cover the light emitter, wherein the transmitter is a transparent electrode provided on a wall of the sleeve.

10. The stylus of claim 9, wherein the transparent electrode is formed of Indium Tim Oxide (ITO).

11. The stylus of claim 6, wherein an exterior surface of the tubular body forms the first surface facing the second region including the light emitter.

12. The stylus of claim 11, wherein the surface of the plate on which the light emitter is provided is mirror-finished to reflect the color light.

13. A color module configured to be housed in a tip end side of an elongated housing, which has a tip end and a tail end along an axial direction, the color module comprising:
an optical sensor configured to receive incoming light incident on the tip end;
a memory configured to store color information of the incoming light captured by the optical sensor;
a light emitter provided adjacent to the tip end and configured to emit color light corresponding to the color information stored in the memory; and
a light blocker interposed between the optical sensor and the light emitter, the light blocker having a first surface facing the light emitter, and the first surface being mirror-finished to reflect the color light emitted from the light emitter.

14. The color module of claim 13, wherein the light blocker is configured as a divider between a first region, in which an optical system configured to guide the incoming light from the tip end to the optical sensor is arranged, and a second region, in which the light emitter is arranged.

15. The color module of claim 14, wherein the light blocker is a tubular body.

16. The color module of claim 15, wherein the optical system includes an optically-transparent rod-shaped piece, which is inserted in the tubular body and used to guide the incoming light from the tip end to the optical sensor.

17. The color module of claim 15, wherein an axis of the tubular body intersects a plate, and the light emitter is provided on a surface of the plate.

18. The color module of claim 17, wherein the light emitter includes light emitting diodes (LEDs) concentrically arranged on the surface of the plate to radially surround the tubular body.

19. The color module of claim 17, wherein the surface of the plate on which the light emitter is provided is mirror-finished to reflect the color light.

20. The color module of claim 19, wherein an exterior surface of the tubular body forms the first surface facing the second region including the light emitter.

* * * * *